United States Patent
Komori et al.

(10) Patent No.: US 7,874,734 B2
(45) Date of Patent: Jan. 25, 2011

(54) WHEEL SUPPORT BEARING ASSEMBLY

(75) Inventors: Kazuo Komori, Iwata (JP); Kazunori Kubota, Iwata (JP); Hiroshi Matsunaga, Iwata (JP); Akira Fujimura, Iwata (JP); Tetsuya Hashimoto, Iwata (JP); Jun Numamoto, Iwata (JP); Masahiro Kiuchi, Utsunomiya (JP)

(73) Assignee: NTN Corporation, Osaka (JP)

( * ) Notice: Subject to any disclaimer, the term of this patent is extended or adjusted under 35 U.S.C. 154(b) by 1019 days.

(21) Appl. No.: 11/444,343

(22) Filed: Jun. 1, 2006

(65) Prior Publication Data

US 2006/0274986 A1 Dec. 7, 2006

(30) Foreign Application Priority Data

| Jun. 2, 2005 | (JP) | 2005-162379 |
| Jun. 2, 2005 | (JP) | 2005-162380 |
| Jun. 2, 2005 | (JP) | 2005-162381 |
| Jun. 2, 2005 | (JP) | 2005-162382 |
| Jun. 2, 2005 | (JP) | 2005-162383 |
| Jun. 2, 2005 | (JP) | 2005-162384 |
| Jun. 2, 2005 | (JP) | 2005-162385 |
| Jul. 14, 2005 | (JP) | 2005-205184 |
| Jul. 14, 2005 | (JP) | 2005-205185 |
| Jul. 19, 2005 | (JP) | 2005-208185 |
| Jul. 19, 2005 | (JP) | 2005-208186 |

(51) Int. Cl.
*F16C 13/00* (2006.01)
*F16C 19/08* (2006.01)
*F16C 33/00* (2006.01)

(52) U.S. Cl. ............... 384/544; 384/537; 384/543; 384/589; 384/625; 29/898.062

(58) Field of Classification Search .......... 384/513, 384/534–544, 585, 589; 29/898.062, 898.063, 29/898.361
See application file for complete search history.

(56) References Cited

U.S. PATENT DOCUMENTS 4,887,917 A * 12/1989 Troster et al. ............... 384/543

(Continued)

FOREIGN PATENT DOCUMENTS

JP 63-184501 7/1988

(Continued)

OTHER PUBLICATIONS

Japanese Office Action issued Nov. 4, 2009 in corresponding Japanese Patent Application 2005-162380.

(Continued)

*Primary Examiner*—Marcus Charles

(57) ABSTRACT

To provide a wheel support bearing assembly, in which the sufficient proof strength of an inner race during assemblage onto the vehicle body can be secured without its function being lowered, the wheel support bearing assembly includes an outer member, an inner member, and rows of rolling elements interposed therebetween. The inner member includes an hub axle having a flange and an inner race on an inner race mount, with raceways defined in the hub axle and the inner race. The inner race has a counterbore at its inboard end. The hub axle has a plastically deformed portion which engages an axially oriented surface of the counterbore when radially outwardly crimped and does not protrude outwardly beyond an inboard end face of the inner race. The difference P between the inner race mount and an outer peripheral face of the plastically deformed portion is 0.13 mm or more.

27 Claims, 14 Drawing Sheets

U.S. PATENT DOCUMENTS

| | | | |
|---|---|---|---|
| 4,893,960 | A | 1/1990 | Beier et al. |
| 5,226,738 | A * | 7/1993 | Valette et al. ............... 384/537 |
| 5,975,765 | A | 11/1999 | Kawamura |
| 6,022,275 | A * | 2/2000 | Bertetti ........................ 384/544 |
| 6,280,096 | B1 | 8/2001 | Miyazaki et al. |
| 6,422,758 | B1 | 7/2002 | Miyazaki et al. |
| 6,485,187 | B1 | 11/2002 | Meeker et al. |
| 6,497,515 | B1 | 12/2002 | Sahashi et al. |
| 6,524,011 | B2 | 2/2003 | Miyazaki et al. |
| 6,574,865 | B2 * | 6/2003 | Meeker et al. ............... 384/537 |
| 6,575,637 | B1 | 6/2003 | Tajima et al. |
| 6,585,420 | B2 | 7/2003 | Okada et al. |
| 6,672,770 | B2 | 1/2004 | Miyazaki et al. |
| 6,715,926 | B2 * | 4/2004 | Tajima et al. ............... 384/544 |
| 6,761,486 | B2 * | 7/2004 | Miyazaki et al. ............ 384/544 |
| 6,879,149 | B2 | 4/2005 | Okada et al. |
| 2001/0046339 | A1 | 11/2001 | Miyazaki et al. |
| 2002/0068639 | A1 | 6/2002 | Tajima et al. |
| 2002/0085781 | A1 | 7/2002 | Ohkuma et al. |
| 2002/0110300 | A1 | 8/2002 | Meeker et al. |
| 2002/0146185 | A1 | 10/2002 | Miyazaki et al. |
| 2003/0002761 | A1 | 1/2003 | Hagiwara |
| 2003/0081872 | A1 | 5/2003 | Sahashi et al. |
| 2003/0103705 | A1 | 6/2003 | Miyazaki et al. |
| 2004/0037482 | A1 | 2/2004 | Ouchi |
| 2004/0120622 | A1 | 6/2004 | Tajima et al. |
| 2005/0094912 | A1 | 5/2005 | Ouchi |
| 2006/0274986 | A1 | 12/2006 | Komori et al. |
| 2008/0089628 | A1 | 4/2008 | Kiuchi et al. |
| 2008/0247700 | A1 | 10/2008 | Komori et al. |
| 2008/0310784 | A1 | 12/2008 | Ohtsuki |

FOREIGN PATENT DOCUMENTS

| | | | |
|---|---|---|---|
| JP | 9-164803 | | 6/1997 |
| JP | 09-164803 | | 6/1997 |
| JP | 9-220904 | | 8/1997 |
| JP | 10-095203 | | 4/1998 |
| JP | 10-196661 | | 7/1998 |
| JP | 11-78408 | | 3/1999 |
| JP | 11-129703 | | 5/1999 |
| JP | 2001-1710 | | 1/2001 |
| JP | 2001-171309 | | 6/2001 |
| JP | 2001-180210 | | 7/2001 |
| JP | 2002-178706 | | 6/2002 |
| JP | 2002-192264 | | 7/2002 |
| JP | 2002-254132 | | 9/2002 |
| JP | 2002-283804 | | 10/2002 |
| JP | 2002-33959 | | 11/2002 |
| JP | 2002-339959 | | 11/2002 |
| JP | 2002-372548 | | 12/2002 |
| JP | 2003-42173 | | 2/2003 |
| JP | 2003-074571 | | 3/2003 |
| JP | 2003-090334 | | 3/2003 |
| JP | 2003-97588 | | 4/2003 |
| JP | 2004-132552 | | 4/2004 |
| JP | 2004-256039 | | 9/2004 |
| JP | 2005-036905 | | 2/2005 |
| JP | 2005-48839 | | 2/2005 |
| JP | 2005-106215 | A * | 4/2005 |
| JP | 2005-233402 | | 9/2005 |
| JP | 2006-52817 | | 2/2006 |
| JP | 2006-105343 | | 4/2006 |
| JP | 2006-112516 | | 4/2006 |
| JP | 2006-161856 | | 6/2006 |
| JP | 2006-161970 | | 6/2006 |
| JP | 2006-336757 | | 12/2006 |
| WO | 02/078979 | | 10/2002 |

OTHER PUBLICATIONS

Japanese Office Action issued Nov. 4, 2009 in corresponding Japanese Patent Application 2005-162383.
Japanese Office Action issued Nov. 4, 2009 in corresponding Japanese Patent Application 2005-162384.
Japanese Office Action issued Nov. 4, 2009 in corresponding Japanese Patent Application 2005-162385.
Patent abstract of Japan, Japanese Publication No. 2001-001710, Published Jan. 9, 2001.
Patent abstract of Japan, Japanese Publication No. 2002-283804, Published Oct. 3, 2002.
Patent abstract of Japan, Japanese Publication No. 2002-295505, Published Oct. 9, 2002.
Patent abstract of Japan, Japanese Publication No. 2001-018604, Published Jan. 23, 2001.
Japanese Office Action issued Mar. 9, 2010 in corresponding Japanese Patent Application No. 2005-162380.
Japanese Notification of Reason(s) for Rejection dated May 18, 2010, issued in related Japanese Application No. 2004-295673.
Chinese Office Action issued Jul. 14, 2010 in related Chinese Patent Application 200880002237.6.
Japanese Office Action issued Jul. 6, 2010 in related Japanese Patent Application 2004-354798.
Japanese Office Action issued Jul. 27, 2010 in related Japanese Patent Application 2005-162379.
European Search Report dated Aug. 2, 2006, for related European Patent Application No. EP 06 01 1320 cites AA, AB, AC and AG.
European Search Report, mailed on Aug. 2, 2006, for corresponding European Patent Application.
Office Action dated Mar. 8, 2010, issued in corresponding U.S. Appl. No. 11/663,850.
Notice of Allowance dated Apr. 5, 2010 issued in corresponding U.S. Appl. No. 12/086,089.
U.S. Appl. No. 11/911,480, filed Mar. 5, 2008, Ozaki et al., NTN Corporation.
U.S. Appl. No. 12/086,153, filed Jun. 6, 2008, Ozaki et al., NTN Corporation.
U.S. Appl. No. 12/086,089, filed Jun. 5, 2008, Ozaki et al., NTN Corporation.
U.S. Appl. No. 12/224,846, filed Sep. 8, 2008, Ozaki et al., NTN Corporation.
Japanese Office Action issued Jun. 1, 2010 in corresponding Japanese Patent Application 2005-205184.
U.S. Office Action mailed Jun. 29, 2010 in related U.S. Appl. No. 11/663,850.
Japanese Office Action issued Mar. 9, 2010 in corresponding Japanese Patent Application 2006-162380.
Japanese Office Action issued Mar. 9, 2010 in corresponding Japanese Patent Application 2005-162383.
Japanese Office Action issued Mar. 9, 2010 in corresponding Japanese Patent Application 2005-162384.
Japanese Office Action issued Mar. 9, 2010 in corresponding Japanese Patent Application 2005-162385.
Japanese Office Action dated Nov. 17, 2009 and issued in corresponding Japanese Patent Application 2005-205185.
Japanese Office Action dated Nov. 17, 2009 and issued in corresponding Japanese Patent Application 2005-208185.
Japanese Office Action dated Nov. 17, 2009 and issued in corresponding Japanese Patent Application 2005-208186.
Japanese Office Action issued Nov. 9, 2010 in corresponding Japanese Patent Application 2004-354798.

* cited by examiner

Fig. 21
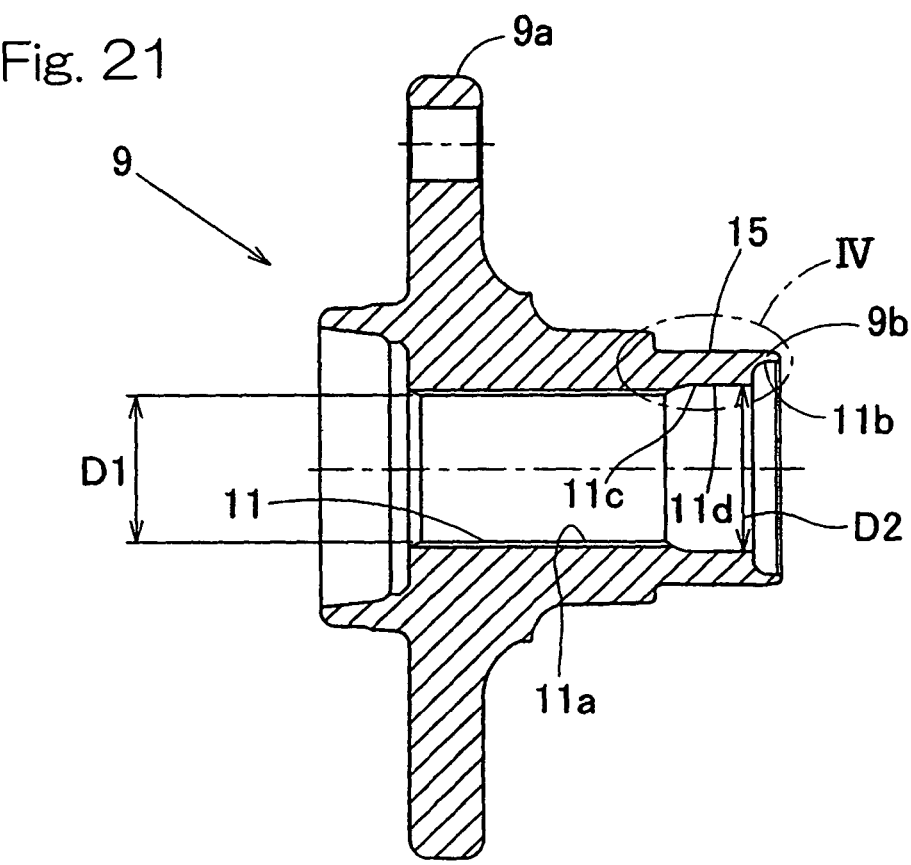
Fig. 22A
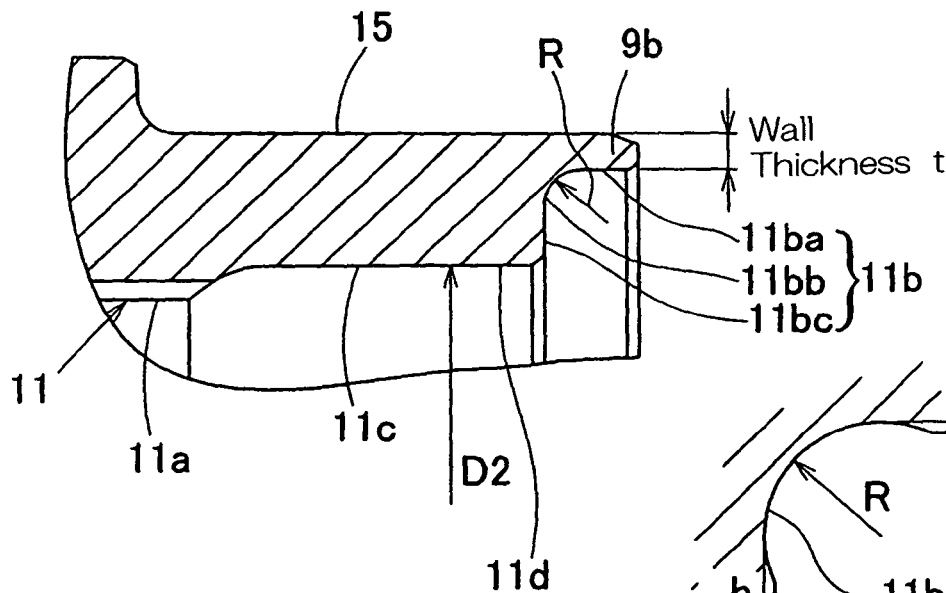
Fig. 22B

WHEEL SUPPORT BEARING ASSEMBLY

BACKGROUND OF THE INVENTION

1. Field of the Invention

The present invention relates to a wheel support bearing assembly for rotatably supporting a vehicle wheel that serves as a vehicle drive wheel used in, for example, automotive vehicles and also to a crimping method therefor.

2. Description of the Prior Art

The wheel support bearing assembly for rotatably supporting a vehicle drive wheel of a structure shown in FIGS. 23 and 24 has been well known in the art. The wheel support bearing assembly shown in FIGS. 23 and 24 is disclosed in, for example, the Japanese Laid-open Patent Publication No. 9-164803, laid open to public inspection on Jun. 24, 1997. Referring to FIGS. 23 and 24, the known wheel support bearing assembly includes double rows of balls 25 operatively interposed between raceways 23 defined in an outer member 21 and raceways 24 defined in an inner member 22, respectively. The inner member 22 is made up of a hub axle 29 having an outer periphery formed with a radially outwardly extending hub flange 29a for the support of the vehicle wheel and an inner race segment 30 mounted externally on a portion of the outer periphery of the hub axle 29 on an inboard side.

The hub axle 29 has an axial bore 31 defined therein, to which a stem portion 33a of an outer race 33 of the constant velocity joint is splined. With the stem portion 33a splined to the hub axle 29 in this manner, an annular shoulder 33b of the stem portion 33a of the outer race 33 of the constant velocity joint is urged against an inboard end face 30a of the inner race segment 30. When a nut 34 is threaded onto an externally threaded free end of the stem portion 33a while the annular shoulder of the stem portion 33a is held in abutment with the inner race segment 30, the inner race segment 22 can be fastened axially by and between the outer race 33 of the constant velocity joint and the nut 34.

In the known wheel support bearing assembly of the structure discussed above, the inner race segment 30 is mounted on a radially inwardly depressed inner race mount 35 defined in an outer periphery of an inboard end portion of the hub axle 29 and, on the other hand, an inboard inner peripheral edge portion of the inner race segment 30, that is delimited between an annular inboard end face thereof and an inner peripheral surface thereof, is depleted axially inwardly of the inner race segment 30 to define a counterbore 36, with the inboard end of the hub axle 29 crimped radially outwardly to allow it to be nested within the counterbore 36. In which way, an undesirable separation of the inner race segment 30 from the hub axle 29, which would otherwise occur under the influence of an external force generated during the mounting of the wheel support bearing assembly on the vehicle body structure, is prevented.

However, this known wheel support bearing assembly has been found having the following problems:

(1) Since a crimped portion 29b of the hub axle 29 is large in size, the radial size of the counterbore 36 formed in the inboard end of the inner race segment 30 must necessarily be within the range of 5 mm to 7 mm in terms of the difference in diameter between the inner peripheral surface of the inner race segment 30 and the diameter of the counterbore 36. If the radial size of the counterbore 36 is so large as described above, the surface area of the inboard end face 30a of the inner race segment 30 decreases correspondingly and, therefore, the pressure of contact with the shoulder 33b of the outer race 33 of the constant velocity joint increases. This leads to a cause of generation of frictional wear and/or obnoxious noises.

(2) When an attempt is made to allow the crimped portion 29b of the hub axle 29 to be accommodated inside of the inboard end of the inner race segment 30, the axial length of the counterbore 36 in the inner race segment 30 must necessarily be within the range of 7 mm to 8 mm. The increased axial length of the counterbore 36 in the inner race segment 30 causes the counterbore 36 in the inner race segment 30 to be positioned on the imaginary line drawn to define the ball contact angle and, therefore, there is the possibility that the inner race segment 30 may be deformed considerably under the influence of an applied load during the operation to such an extent as to reduce the life of the wheel support bearing assembly.

The increased axial length of the counterbore 36 may also result in reduction of the mounting length (surface area), over which the inner race segment 30 is mounted on the hub axle 29, and, accordingly, creepage of the inner race segment 30 is apt to occur, accompanied possibly by reduction of the bearing life. Although those problems can be resolved if the inner race segment having an increased axial length is employed, the use of the inner race segment of the increased axial length in turn require an extra space in a direction axially thereof.

(3) Also, since the crimped portion 29b of the hub axle 29 is large in size, a crimping tool will interfere with the inner race segment 30 during the practice of a vibratory crimping process, making it difficult to accomplish the crimping.

SUMMARY OF THE INVENTION

In order to substantially eliminate the foregoing problems and inconveniences inherent in the prior art wheel support bearing assembly discussed above, the present invention has for its essential object to provide an improved wheel support bearing assembly, in which the sufficient proof strength of the inner race segment during assemblage of the bearing assembly onto the vehicle body structure can be secured without the bearing function being affected adversely.

The term "proof strength" of the inner race segment hereinafter used in this specification including the appended claims means the ability of the inner race segment to resist against separation thereof from the inner race mount defined in the hub axle toward the outboard side.

In order to accomplish the foregoing object, the present invention in accordance with one aspect thereof provides a wheel support bearing assembly for rotatably supporting a vehicle drive wheel, which includes an outer member having an inner peripheral surface formed with a plurality of raceways, and an inner member having raceways cooperable with and aligned with the raceways in the outer member and made up of an hub axle and an inner race segment, and a plurality of rows of rolling elements operatively interposed between the raceways in the outer member and the raceways in the inner member, respectively. The hub axle has an inner race mount defined in an inboard end portion thereof with the inner race segment mounted on the inner race mount of the hub axle and also has a hub flange formed therein so as to extend radially outwardly therefrom for supporting the vehicle wheel. The raceways in the inner member are defined in the hub axle and the inner race segment, respectively. The inner race segment has an inner peripheral surface formed with a counterbore defined in an inboard end of the inner peripheral surface and the hub axle is provided with a plastically deformed portion which is, when radially outwardly crimped by means of a crimping technique, brought into engagement with an axially oriented surface area of the counterbore in the inner race segment. The plastically deformed portion does not protrude outwardly beyond an inboard end face of the inner race segment and the difference between the inner race mount of the hub axle and an outer peripheral face of the plastically deformed portion is chosen to be 0.13 mm or more.

According to the present invention, the difference between the inner race mount of the hub axle and an outer peripheral face of the plastically deformed portion is chosen to be 0.13 mm or more, a sufficient proof strength of the inner race segment can be obtained. As described above, with the wheel support bearing assembly of the present invention, the undesirable separation of the inner race segment during the assemblage of the wheel support bearing assembly on the vehicle body structure can be advantageously prevented without the bearing function being adversely affected.

In a preferred embodiment of the present invention, the axially oriented surface area of the counterbore of the inner race segment and the inner peripheral surface of the inner race segment may be continued to each other through a transit junction having a curved face. According to this feature, the axially oriented surface area of the counterbore of the inner race segment and the inner peripheral surface of the inner race segment are smoothly continued to each other through the curved face forming the transit junction and, therefore, an undesirable reduction in strength brought about by a concentration of stresses on the transit junction when a force toward the outboard side tending to separate the inner race segment acts can advantageously be suppressed.

In another preferred embodiment of the present invention, the transit junction, which is the curved face, may extend axially within a range off from an imaginary line drawn to define a contact angle of the rolling elements. The imaginary line drawn to define the contact angle of the rolling element represents a line of action of a composite force of the load of the rolling element (a force acting on points of contact of the rolling elements with the associated raceway).

Where the transit junction that smoothly connects between the axially oriented surface area of the counterbore of the inner race segment and the inner peripheral surface of the inner race segment lie on the imaginary line drawn to define the contact angle, there is the possibility of the inner race segment being considerably deformed under the influence of the applied load during the operation, accompanied by reduction of the life of the wheel support bearing assembly. Accordingly, if the transit junction extends axially within a range off from an imaginary line drawn to define the contact angle as hereinabove described, not only can the sufficient proof strength be obtained, but the undesirable deformation of the inner race segment under the influence of the applied load during the operation can also be minimized, accompanied by increase of the life.

In a further preferred embodiment of the present invention, the raceway in the hub axle may be a surface-hardened raceway, the plastically deformed portion may be left untreated with heat and the inner race segment may be heat treated to harden in its entirety ranging from surface to core thereof.

For increasing the rolling life, the raceway in the hub axle is preferably surface treated to increase the hardness thereof, but a portion where the crimping is effected is preferably left untreated with heat to facilitate the crimping. Since the inner race segment is a small component part having the raceway defined therein and is mounted on the inner race mount defined in the hub axle, the inner race segment is preferably heat treated to harden in its entirety ranging from surface to core thereof to thereby increase the rolling life and the wear resistance of the inner race mount.

In a still further preferred embodiment of the present invention, the axially oriented surface area of the counterbore in the inner race segment may be turned prior to the heat treatment to form a turned surface.

According to this feature, although the counterbore of the inner race segment is of a size as small as possible and is heat treated, turning of the axially oriented surface area of the counterbore in the inner race segment is effective to ensure the required proof strength of the inner race segment. Since the axially oriented surface area is finished prior to the heat treatment as the turned surface, no extra processing step such as a grinding step need be added.

In a yet preferred embodiment of the present invention, the plastically deformed portion may be left untreated with heat and a portion of an outer peripheral surface of the hub axle ranging from the raceway in the hub axle to the inner race mount may be hardened to have a hardened surface layer by means of an induction hardening technique. Also, the hardened surface layer may have an inboard end set at a point encompassed within a region ranging from a point of intersection between the imaginary line, drawn to define a contact angle and the inner race mount, to a point of intersection between the hub axle and the axially oriented face area of the counterbore in the inner race segment.

According to this feature, since the hardened surface layer is formed in that portion of the outer peripheral surface of the hub axle ranging from the raceway in the hub axle to the inner race mount, the wear resistance of an axle portion of the hub axle during the operation of the wheel support bearing assembly can be increased conveniently. Also, since the plastically deformed portion of the hub axle is left untreated with heat, it is possible to facilitate the crimping work. Further, since the inboard end of the hardened surface layer is set at a point encompassed within the region between the point of intersection between the imaginary line, drawn to define the contact angle, to a point of intersection between the hub axle and the axially oriented face area of the counterbore in the inner race segment, it is possible to avoid an occurrence of cracking in the inboard end portion of the hub axle when the plastically deformed portion of the hub axle is crimped.

In a yet further preferred embodiment of the present invention, the hub axle may have an axial bore defined therein in alignment with a longitudinal axis thereof and an inboard end of the hub axle may be formed with a tubular crimping wall having an inner peripheral surface of a diameter greater than the axial bore of the hub axle. Also, the tubular crimping wall referred to above may extend from a position adjacent an outboard end of the counterbore of the inner race segment to a position adjacent an end face of the inner race segment and has a radial wall thickness within the range of 1.5 to 4 mm. This tubular crimping wall, when plastically deformed by means of a diameter expanding technique, defines the plastically deformed portion.

Where the tubular crimping wall of the hub axle has an inner peripheral surface of a diameter greater than that of the axial bore of the hub axle, the tubular crimping wall has a reduced wall thickness enough to facilitate the diameter expansion crimping thereof. Also, since the inner peripheral surface of the tubular crimping wall is radially inwardly recessed to provide a large diameter, it is possible to avoid any interference with a base end of the stem portion of the constant velocity joint, which has a progressively increasing diameter, when the stem portion of the universal joint is inserted into the axial bore of the hub axle. The interference brought about by the base end of the stem portion will result in radial push of the hub axle enough to cause the inner race segment to be deformed when the nut is fastened onto the externally threaded outboard end of the stem portion. For this reason, this interference is necessarily avoided.

Reduction of the wall thickness of the tubular crimping wall results in a corresponding increase of an inner diameter of the counterbore to thereby ensure avoidance of the interference with the base end of the stem portion of the constant velocity joint. However, if the wall thickness of the tubular crimping wall is equal to or smaller than 4 mm, the previously discussed interference can be sufficiently avoided.

While the tubular crimping wall has a wall thickness preferably as small as possible in order to avoid the problematic interference, excessive reduction of the wall thickness of the tubular crimping wall will result in that the extent to which the inner diameter of a hub pilot area, defining an entrance leading to the axial bore of the hub axle, is reduced will become large when the tubular crimping wall is crimped to increase the diameter. Once the inner diameter of the hub pilot area is so reduced, a stem pilot area of the stem portion of the constant velocity joint, which is a portion engaged with the hub pilot area, would not engage in the hub pilot area with no difficulty. For this reason, in order to suppress the reduction of the inner diameter of the hub pilot area during the diameter expansion work, the tubular crimping wall preferably necessarily has a wall thickness equal to or greater than 1.5 mm.

Considering that the wall thickness of the tubular crimping wall affects the proof strength of the inner race segment during assemblage of the wheel support bearing assembly onto the vehicle body structure and no required proof strength can be obtained if it is too small, the sufficient proof strength of the inner race segment can be secured if the wall thickness of the tubular crimping wall is equal to or greater than 1.5 mm.

In a yet further preferred embodiment of the present invention, the counterbore may be stepped in two stages to define a reduced diameter counterbore portion and a large diameter counterbore portion on an inboard side of the reduced diameter counterbore portion, in which case the inboard end portion of the inner peripheral surface of the inner race mount is provided with a plastically deformed portion. This plastically deformed portion is, when radially outwardly crimped by means of a crimping technique, brought into engagement with the axially oriented surface areas of the reduced diameter portion and the large diameter portion of the counterbore in the inner race segment, and does not protrude outwardly beyond the inboard end face of the inner race segment.

According to this structural feature, since the plastically deformed portion of the hub axle resulting from the plastic deforming work is engaged with the axially oriented surface area of the counterbore that is stepped in two stages to define the reduced diameter counterbore portion and the large diameter counterbore portion, it is possible to increase the proof strength of the inner race segment during assemblage of the wheel support bearing assembly onto the vehicle body structure as compared with the case in which the counterbore has one-stage counterbore portion.

In a yet further preferred embodiment of the present invention, the plastically deformed portion of the hub axle may be held in abutment only with axially oriented surface area of the reduced diameter counterbore portion and the axially oriented surface area of the large diameter counterbore portion of the inner race segment and does not contact respective inner peripheral faces of the reduced and large diameter counterbore portions. Specifically, if the plastically deformed portion of the hub axle is engaged with only the axially oriented surface areas in the counterbore of the inner race segment, an occurrence of hoop stresses can be prevented.

In a yet further preferred embodiment of the present invention, the hub axle may have an axial bore defined therein in alignment with a longitudinal axis thereof and the plastically deformed portion may have an inner peripheral surface defining a stepped face portion of a diameter greater than that of the axial bore. Plastic working of the hub axle that can be employed in this case may be a diametric expansion process for increasing a portion of the diameter of the hub axle adjacent the inboard end thereof. Thus, when the plastically deformable portion is diametrically expanded, unlike the vibratory crimping work, it is possible to cause the plastically deformed portion to assuredly engage in the counterbore even though the counterbore has a slight difference in radius and, therefore, the reliability can increase.

In a yet further preferred embodiment of the present invention, the hub axle may have an axial bore defined therein in alignment with a longitudinal axis thereof and the counterbore may be of a shape including a cylindrical straight surface potion, in the form of a cylindrical surface portion, and an annular end surface portion intervening between the straight surface portion and the inner peripheral surface of the inner race segment and the plastically deformed portion may not contact the straight surface portion. In this case, since the plastically deformed portion of the hub axle that is to be engaged in the counterbore does not contact the straight surface portion, it is possible to minimize the amount of the diameter of the inner race segment that is expanded when the plastically deformed portion is crimped by means of the diameter expansion crimping process. Accordingly, an undesirable deformation of the raceway in the inner race segment, which would otherwise result from the crimping work, can advantageously be avoided and, hence, an undesirable reduction of the bearing function such as, for example, reduction of the life, which would result from the possible deformation of the raceway in the inner race segment, can be prevented.

The annular end surface portion of the counterbore defined in the inner race segment may be a tapered face. The tapered face is effective to allow the plastically deformed portion to engage an inner end face of the counterbore by the effect of plastic flow taking place during the crimping and, therefore, the assured engagement can be achieved as compared with a radially lying surface portion.

In a yet further preferred embodiment of the present invention, the tapered face may be inclined at an angle of 12° or more relative to the longitudinal axis of the hub axle. When the angle of inclination of the tapered face inside the counterbore in the inner race segment, which face is engaged with the plastically deformed portion of the hub axle, is selected to be 12° or more relative to the longitudinal axis of the hub axle, the required proof strength of the inner race segment can be secured.

In a yet further preferred embodiment of the present invention, the hub axle may have an axial bore defined therein in alignment with a longitudinal axis thereof and having an inner peripheral surface formed with a plurality of splined grooves that are engageable with corresponding splined keys defined in an outer periphery of a stem portion of a constant velocity joint. This axial bore may include a general diameter portion, where the splined grooves are formed. Also, the axial bore includes a bore portion located on an inboard side of the general diameter bore portion, which may be stepped in two stages to include a large diameter bore portion, defining an inner peripheral surface of the plastically deformed portion, and an intermediate diameter bore portion of a diameter smaller than that of the large diameter bore portion, but greater than the maximum diameter of the general diameter bore portion as measured in the circle depicted in touch with bottoms of the splined grooves.

Where the inboard end of the axial bore of the hub axle is of a shape stepped in two stages as described above, the intermediate diameter bore portion can serve as a guide for guiding insertion of the stem portion of the constant velocity joint, resulting in increase of the assemblability.

In a yet further preferred embodiment of the present invention, the intermediate diameter bore portion of the axial bore of the hub axle may be positioned at a location axially deep from an axial position of the counterbore of the inner race segment.

Where the intermediate diameter bore portion of the axial bore of the hub axle is positioned at a location axially deep from an axial position of the counterbore of the inner race segment, even when the crimping die is inserted with its leading end moved deep past the plastically deformed portion at the time the plastically deformed portion is to be radially outwardly crimped with the use of the crimping die, the crimping die will not interfere with the intermediate diameter bore portion, allowing the crimping process to be performed smoothly. For this reason, when for the crimping die, the one having that peripheral edge portion of the leading end thereof tapered is employed, molding of the plastically deformed portion is possible with a low processing load and the load on the bearing assembly during the crimping process can advantageously be minimized.

In a yet further preferred embodiment of the present invention, a portion of the large diameter bore portion defining the inner peripheral surface of a plastically deformed portion, which is brought into contact with a crimping die, may be rendered to be a tapered portion flaring towards an opening, which is inclined at an angle within the range of 5° to 60° relative to the longitudinal axis of the hub axle. That portion of the hub axle, which is brought into contact with the crimping die, will be a replica of the annular abutment face of the crimping die where the crimping die of a kind having its leading end having a tapered abutment face defined therein.

In a yet further preferred embodiment of the present invention, the large diameter bore portion may have an inner peripheral surface of a shape including a crimping jig introducing portion positioned in a deep region of the large diameter bore portion and a tapered portion flaring from the crimping jig introducing portion towards an opening and positioned inside an inner periphery of the plastically deformed portion.

In a yet further preferred embodiment of the present invention, the plastically deformed portion of the hub axle may have a hardness equal to or lower than HRC (Hardness on the Rockwell C scale) 28. This is particularly advantageous in that the crimping can be carried out with a low processing load.

According to the foregoing features, since that portion of the large diameter bore portion, forming a part of the inner periphery of the plastically deformed portion and engageable with the crimping die, is so tapered as to flare towards the opening, the crimping work can be carried out with a low processing load when the plastically deformed portion is to be crimped with the crimping jig. Because of this, the load which would be imposed on the raceways and the rolling element of the bearing assembly during the crimping can be reduced and the crimping can be accomplished at a reduced cost, using inexpensive facilities having a low power.

The smaller the angle of inclination of the annular abutment face of the crimping die, the lower the processing load with which the crimping is possible. However, if the inclination angle becomes small, the crimping die would be required to have a leading end of a substantial length, which end is inserted deep beyond the portion forming a part of the inner peripheral surface of the plastically deformed portion. This in turn result in the necessity of avoiding the interference with the end face of the intermediate diameter bore portion of the axial bore of the hub axle, with the product shape restricted consequently. Because of this, in order to avoid this interference, the angle of inclination of the abutment face of the crimping die that is required to accomplish the crimping with a low processing load is preferably within the range of 5° to 60° as discussed hereinbefore.

In a yet further preferred embodiment of the present invention, the hub axle may have an axial bore defined therein in alignment with a longitudinal axis thereof and an inboard end of the hub axle may be formed with a wall thinning counterbore portion of a diameter greater than the axial bore defined in an inner periphery thereof to thereby leave a tubular crimping wall that does not protrude outwardly from an annular end face of the inner race segment. The wall thinning counterbore portion may have an inner periphery of a shape delimited by a cylindrical surface region, a radially lying annular surface region and a generally arcuate transit surface region intervening between the cylindrical surface region and the radially lying annular surface region. The arcuate transit surface region referred to above may have a radius of curvature equal to or greater than 1.9 mm. In this case, the tubular crimping wall is plastically deformed by means of a diameter expanding technique to provide a plastically deformed portion.

When the tubular crimping wall has its inner periphery formed with the wall thinning counterbore portion of a shape including the cylindrical surface region, the radially lying annular surface region and the generally arcuate transit surface region intervening between the cylindrical surface region and the radially lying annular surface region, and the radius of curvature of the arcuate surface region is chosen to be equal to or greater than 1.9 mm, the amount of the inboard end of the axial bore of the hub axle that is reduced during the diameter expansion crimping process effected to the tubular crimping wall can be minimized. Because of this, it is possible to accomplish a diameter expansion crimping by crimping to such an extent that insertion of the stem portion of the outer race of the constant velocity joint and engagement, which serves as a counterpart component, with a stem pilot portion, which is a base end of the stem portion, will not be hampered.

The present invention in accordance with another aspect thereof also provides a method of crimping a plastically deformed portion in a wheel support bearing assembly of the present invention, in which the plastically deformed portion in the wheel support bearing assembly has an inner peripheral surface which is a cylindrical portion forming a part of the large diameter counterbore portion before it is crimped. This crimping method includes urging a crimping die of a structure comprising a free end having an outer peripheral edge tapered to define an annular abutment face, against the cylindrical portion with the annular abutment face held in contact with an open edge of an inner periphery of the cylindrical portion; and causing the cylindrical portion to radially outwardly expand by crimping to thereby define a plastically deformed portion.

Using the crimping die of the structure including the free end having the outer peripheral edge tapered to define the annular abutment face, it is possible to accomplish the molding of the plastically deformed portion with a low processing load and the load on the bearing assembly during the crimping can also be minimized.

In a preferred embodiment of the present invention, the annular abutment face of the crimping die may have a surface roughness equal to or smaller than Ra 1 μm. When the surface roughness of the annular abutment face of the crimping die is chosen to be equal to or smaller than Ra 1 μm, the crimping can be carried out smoothly without inducing any inconvenience in appearance and processing such as brought about by galling and/or adhesion.

In another preferred embodiment of the present invention, the annular abutment face of the crimping die may be inclined at an angle within the range of 5° to 60° relative to a longitudinal axis.

According to this method, since the annular abutment face of the crimping die is inclined at an angle of 5 or more, the leading end of the crimping die can have a reduced length and the restriction imposed on the product shape, which would otherwise be brought about in order to avoid the interference between the product and the crimping jig, can be reduced. On the other hand, since the uppermost limit of this inclination angle is chosen to be equal to or smaller than 60°, the crimping can be carried out with a low processing power.

In a further preferred embodiment of the present invention, the annular abutment face of the crimping die may have a hardness equal to or higher than HRC 30. Selection of the hardness of the annular abutment face of the crimping die, which is equal to or higher than HRC 30 is effective to achieve the crimping process, which brings about the plastic deformation of the plastically deformed portion, and, also, the continuous crimping can be performed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 21 is a longitudinal sectional view of the hub axle employed in the wheel support bearing assembly shown in FIG. 20A;

FIG. 22A is a fragmentary sectional view showing a portion of the hub axle which is encompassed in the ellipse depicted in FIG. 21;

FIG. 22B is a fragmentary sectional view showing an arcuate portion of the hub axle of FIG. 22A on an enlarged scale;

DETAILED DESCRIPTION OF THE EMBODIMENTS

Figure 1:
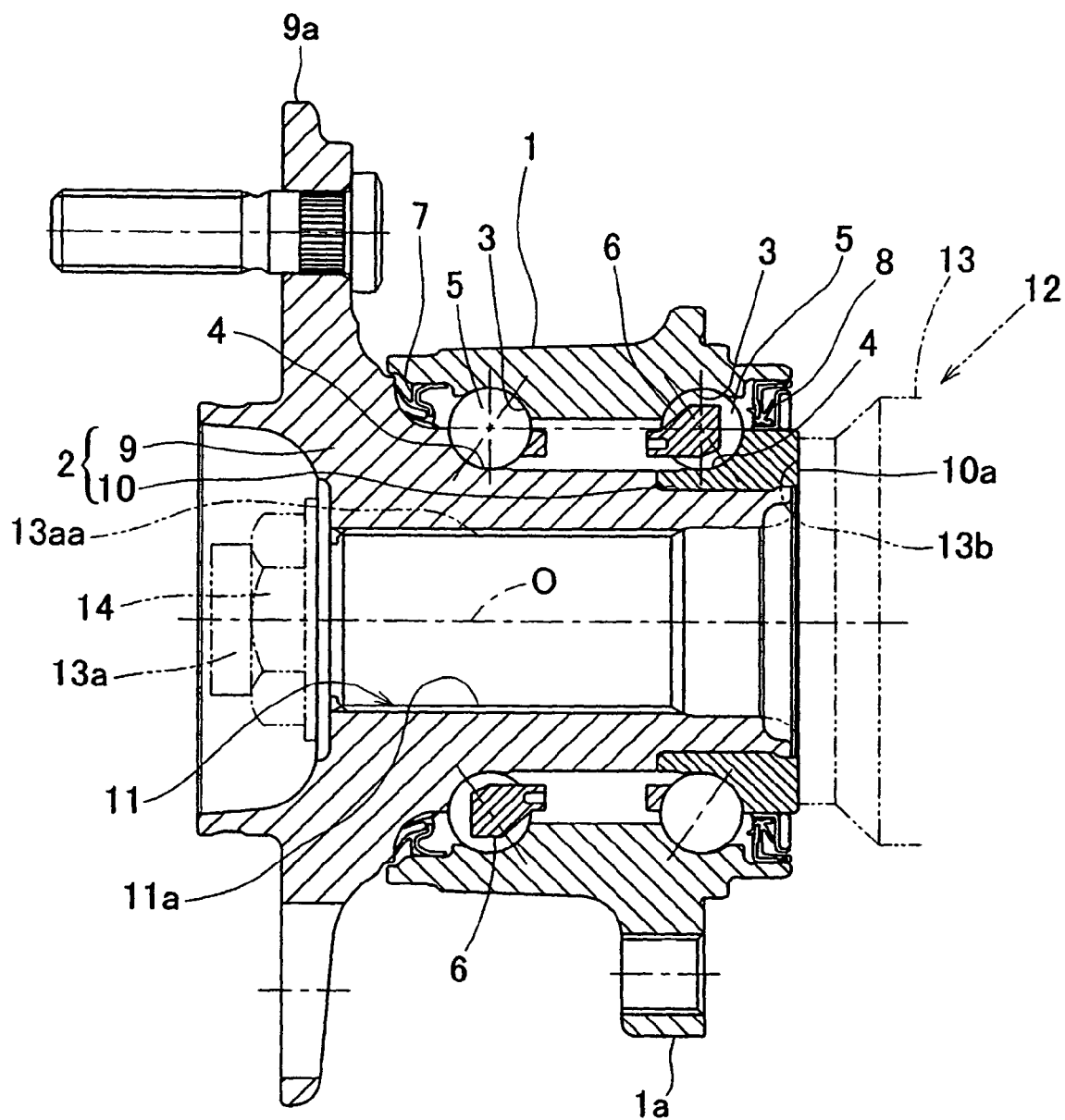
FIG. 1 is a longitudinal sectional view of a wheel support bearing assembly according to a first preferred embodiment of the present invention.
Figure 2:
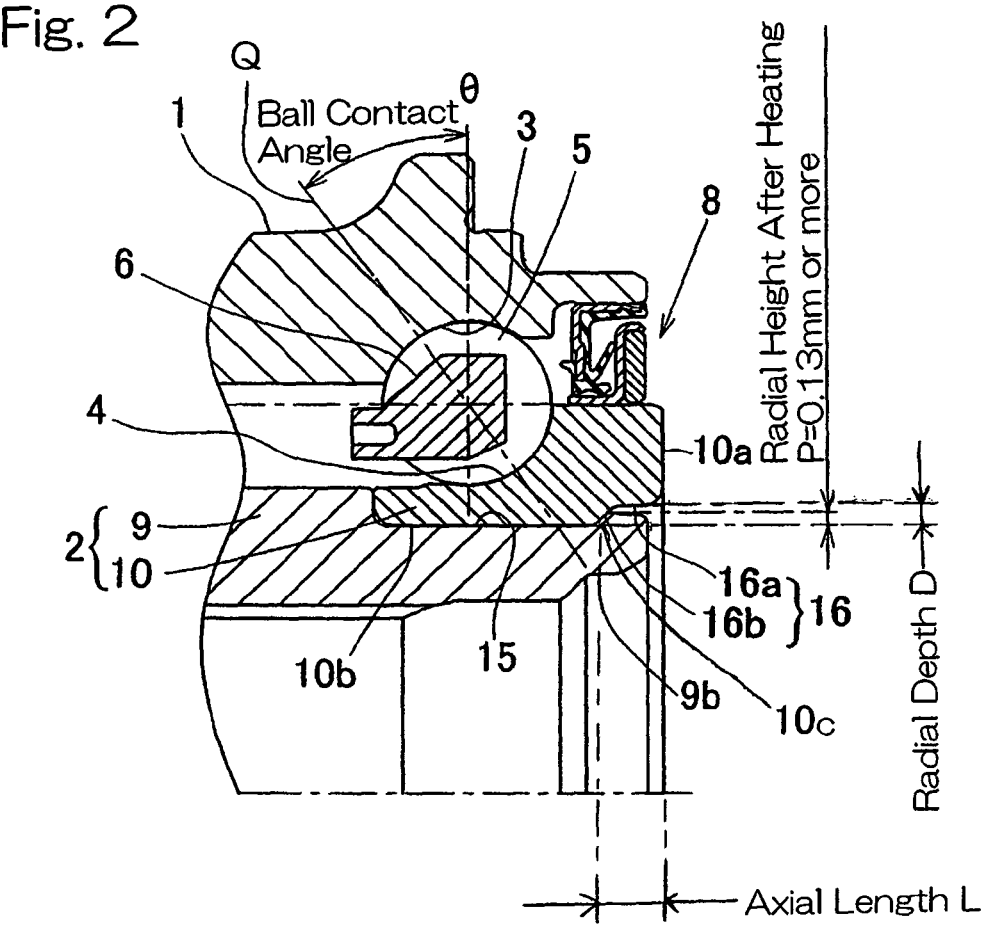
FIG. 2 is a fragmentary longitudinal sectional view showing, on an enlarged scale, an important portion of the wheel support bearing assembly shown in FIG. 1.

With reference to FIGS. 1 and 2, a first preferred embodiment of the present invention will be described in detail. This embodiment is directed to a third generation wheel support bearing assembly of an inner race rotating type that is used for rotatably supporting a vehicle drive wheel. It is to be noted that the terms "inboard" and "outboard", hereinabove and hereinafter used in this specification including the appended claims, are to understood as descriptive of the position in a direction widthwise of and relative to a vehicle body structure that lies on opposite sides of the vehicle body structure close towards and away from the longitudinal center of the vehicle body structure, respectively.

The illustrated wheel support bearing assembly includes an outer member 1 having an inner peripheral surface formed with a plurality of, for example, two, inwardly grooved outboard and inboard raceways 3, an inner member 2 positioned inside the outer member 1 and having two inwardly grooved outboard and inboard raceways 4 defined therein in cooperative relation to and in alignment with the respective raceways 3 of the outer member 1, and rows of rolling elements 5 each row interposed between the outboard or inboard raceways 3 of the outer member 1 and the outboard or inboard raceways 4 of the inner member 2, respectively.

The wheel support bearing assembly referred to above is of an angular contact ball bearing type and the rolling elements 5 are employed in the form of a ball and are operatively retained by a ball retainer 6 for each row of the balls 5. The outboard and inboard raceways 3 and 4 have a generally arcuate sectional shape and the outboard raceways 3 and 4 of the outer and inner members 1 and 2 and the inboard raceways 3 and 4 of the outer and inner members 1 and 2 are so designed as to permit their respective ball contact angles to be held in back-to-back relation to each other. With the inner member 2 positioned inside the outer member 1, an annular bearing space is delimited therebetween and has its opposite annular open ends sealed by respective sealing members 7 and 8.

The outer member 1 serves as a stationary or fixed member and is of one-piece construction including a radially outwardly extending coupling flange 1a formed in an inboard end thereof for firm connection with a knuckle forming a part of an automobile suspension system mounted on a vehicle body structure (not shown).

On the other hand, the inner member 2 serves as a rotatable member and is made up of a hub axle 9, having a hub flange 9a formed in an outboard end thereof so as to extend radially outwardly thereof for the support of a vehicle wheel (not shown), and an annular inner race segment 10 fixedly mounted on an onboard end of the hub axle 9. The outboard and inboard raceways 4 of the inner member 2 as discussed above are, in the illustrated embodiment, defined in the hub axle 9 and the inner race segment 10. The hub axle 9 has an axially extending bore 11 defined therein, and a surface region of the hub axle 6, which defines the outboard raceway 4 of the inner member 2, are hardened by the use of a surface hardening treatment. In contrast thereto, the inner race segment 10 is hardened by the use of a hardening treatment in its entirety ranging from surface to core thereof.

As shown on an enlarged scale in FIG. 2, the hub axle 9 has an inboard end portion thereof radially inwardly depressed from an outer peripheral surface thereof to define an inner race mount 15 of an outer diameter smaller than that of the remaining portion of the hub axle 9. The inner race segment 10 referred to above is fixedly nested or mounted on the inner race mount 15 and is held firmly in position in a manner as will now be described.

With the inner race segment 10 having not yet been mounted on the inner race mount 15, the inner race mount 15 has a consistent outer diameter throughout the entire axial length ranging from a step, that is left by radially inwardly depressing that inboard end portion of the hub axle 9, to an inboard extremity of the hub axle 9. On the other hand, the inner race segment 10 to be mounted on the inner race mount 15 has an inboard inner peripheral edge portion delimited between an annular inboard end face 10a thereof and an inner peripheral surface 10b thereof, which is slightly depleted axially inwardly of the inner race segment 10 to define an small annular wall thinning counterbore 16, which is of a diameter greater than the inner diameter of the inner race segment 10 and which is delimited by an axially inwardly extending peripheral wall 16a and an annular bottom wall 16b tapered axially inwardly. The counterbore 16 forms a stepped portion on the inner peripheral surface 10b, which is radially outwardly recessed. As will become clear from the subsequent description, the annular bottom wall 16b of the wall thinning counterbore 16 defines an annular abutment face with which the inner race segment 10 is engaged.

The inner race segment 10 is mounted on and fixed on the inboard end portion of the hub axle 9, specifically the inner race mount 15 in the hub axle 9 in the following manner. While the inner race mount 15 remains having a consistent outer diameter throughout the axial length thereof, the inner race mount 15 is relatively inserted into a center bore of the annular inner race segment 10 until the annular bottom wall of the inner race mount 15 is brought into engagement with an annular outboard end face of the inner race segment 10. Then, by the use of any known crimping technique, the inboard extremity of the hub axle 9 is radially outwardly crimped to define a plastically deformed portion 9b that is oriented axially so as to engage the annular tapered bottom wall 16b, but as to be spaced a slight distance radially inwardly from the peripheral wall 16a in the inner race segment 10. It is to be noted that the annular tapered bottom wall or abutment face 16b referred to above is positioned on an inboard side with respect to the imaginary line Q drawn to define the ball contact angle between the inboard row of the balls 5 and the inboard raceway 4 defined in the inner race segment 10 as clearly shown in FIG. 2.

The wheel support bearing assembly of the structure described above is suitably used in general passenger cars particularly ranging from compact cars to limousines and is therefore so sized as to enable it to be incorporated in those passenger cars. In such case, however, the wall thinning counterbore 16, defined in the that inboard inner peripheral edge portion of the inner race segment 10 by the peripheral wall 16a and the annular tapered bottom wall 16b, is so sized as to have an axial length L within, for example, the range of 0.25 to 6 mm and a radial depth D within, for example, the range of 0.25 to 2.5 mm. The axial length L is defined as the distance over which the wall thinning counterbore 16 extends axially inwardly of the inner race segment 10, whereas the radial depth D is defined as the difference between the diameter of the peripheral wall 16a of the wall thinning counterbore 16 and the inner peripheral diameter of the hollow of the inner race segment 10.

The plastically deformed portion 9b referred to above may alternatively be so sized as to permit it to engage both of the annular tapered bottom wall 16b and the peripheral wall 16a in the inner race segment 10. However, regardless of whether the plastically deformed portion 9b is engaged with only the annular tapered bottom wall 16b or whether it is engaged with both of the annular tapered bottom wall 16b and the peripheral wall 16a, the plastically deformed portion 9b should be so sized as not to protrude axially outwardly beyond the plane of the annular inboard end face 10a of the inner race segment 10. Also, this plastically deformed portion 9b has a radial height P, represented by the amount of protrusion thereof in a radially outward direction from the inner race mount 15, which height P is chosen to be equal to or greater than 0.13 mm, but equal to or smaller than the maximum permissible radial depth D of the wall thinning counterbore 16, that is, 2.5 mm.

The crimping technique referred to above is applied over the entire circumference of the inboard extremity of the hub axle 9 by the use of a press work. Specifically, the crimping technique is carried out in such a manner as to permit the inboard extremity of the hub axle 9, after the inner race segment 10 has been mounted on the inner race mount 15, to be diametrically outwardly expanded. This plastically deformed portion 9b to which the crimping technique is applied is left to be a non-heat treated portion.

In mounting the wheel support bearing assembly of the structure described above on the vehicle body structure, a stem portion 13a integral with an outer race 13 of a constant velocity joint 12, which forms one of joint members, is inserted into the axial bore 11 of the hub axle 9, with splined keys 13aa on an outer peripheral surface of the stem portion 13a engaged in corresponding splined grooves 11aa in an inner peripheral surface of the axial bore 11, and a fastening nut 14 is then threaded firmly onto an externally threaded outboard end of the stem portion 13a. In this way, the outer race 13 of the constant velocity joint 12 is drivingly coupled with the inner member 2. As the fastening nut 14 is fastened, the outer race 13 of the constant velocity joint 12 is drawn towards the outboard side such that an outboard-oriented annular shoulder 13b of the outer race 13 is urged against the annular inboard end face 10a of the inner race segment 10, with the inner member 2 consequently fastened axially between the fastening nut 14 and the outer race 13 of the constant velocity joint 12.

The hub flange 9a for the support of the vehicle wheel is positioned on the outboard end of the hub axle 9, and the vehicle wheel (not shown) is secured to the hub flange 9a by means of a plurality of bolts 17 with a brake rotor (not shown) intervening between it and the hub flange 9a.

In the wheel support bearing assembly of the structure described above, that inboard inner peripheral edge portion of the inner race segment 10 is depleted axially inwardly to define the annular wall thinning counterbore 16, in which the plastically deformed portion 9b integral with the hub axle 9 and formed by the crimping technique applied to the hub axle 9 is engaged. Therefore, it is possible to substantially avoid an undesirable separation of the inner race segment 10 from the hub axle 9, which would otherwise occur under the influence of an external force generated during the mounting of the wheel support bearing assembly on the vehicle body structure.

Since the wall thinning counterbore 16 is defined in a very limited area in the inner race segment 10, which is delimited by the axially inwardly extending peripheral wall 16a and the axially inwardly tapered annular bottom wall 16b, the wall thinning counterbore 16 may be small in size while it cooperates with the plastically deformed portion 9b to avoid the undesirable separation of the inner race segment 10 from the hub axle 9. Because of this, even though the wall thinning counterbore 16 is employed, reduction in surface area of the annular inboard end face 10a of the inner race segment 10 can advantageously be minimized and, also, increase of the pressure of contact between it and the annular shoulder 13b of the outer race 13 of the constant velocity joint 12 can be suppressed, resulting in alleviation of the occurrence of a frictional wear and noises.

In particular, since the radial height P of the plastically deformed portion 9b, which is represented by the amount of protrusion thereof in a radially outward direction from the inner race mount 15, is chosen to be equal to or greater than 0.13 mm, the sufficient proof strength of the inner race segment 10 can be secured. This proof strength of the inner race segment 10 is the ability of the inner race segment 10 to resist against separation thereof from the inner race mount 15.

According to the result of a series of experiments conducted by the inventors of the present invention, it has been ascertained that when the radial height P was set to 0.13 mm, the proof strength of the inner race segment 10 was found to be about 40 kN. On the other hand, those series of experiments have shown that in order to prevent the inner race segment 10 from axially separating from the inner race mount 15 during the mounting of the wheel support bearing assembly on the vehicle body structure, the proof strength equal to or greater than 2 tons or more was required. In view of the results of the experiments, selection of the radial height P of a value equal to or greater than 0.13 mm such as in the foregoing embodiment is effective to provide the sufficient proof strength with which the undesirable separation of the inner race segment 10 from the inner race mount 15 can be substantially avoided.

As discussed above, with the wheel support bearing assembly of the structure described hereinabove, it is possible to substantially avoid the undesirable separation of the inner race segment 10 from the inner race mount 15 and, hence, the hub axle 9 during the mounting of the wheel support bearing assembly on the vehicle body structure, without the bearing function being affected adversely.

Also, a transit junction 10c between the annular tapered bottom wall 16b of the wall thinning counterbore 16 in the inner race segment 10, which has an annular face oriented generally axially inboards, and the inner peripheral surface 10b of the inner race segment 10 represents a curved face of a substantially or generally arcuate or parabolic sectional shape such that the annular tapered bottom wall 16b and the inner peripheral surface 10b are smoothly continued to each other. More specifically, the curve depicted by the sectional shape of the transit junction 10c is smoothly continued to the curve, depicted by the sectional shape of the inner peripheral surface 10b of the inner race segment 10, and also to the curve depicted by the sectional shape of the annular tapered bottom wall 16b of the wall thinning counterbore 16. This transit junction 10c extends axially within a range off from the imaginary line Q drawn to define the ball contact angle $\theta$ of the inboard row of the balls 5 and the inboard raceway 4 defined in the inner race segment 10.

As hereinabove described, when the transit junction 10c delimited between the inboard-oriented tapered bottom wall 16b of the wall thinning counterbore 16 in the inner race segment 10 and the inner peripheral surface 10b of the inner race segment 10 is formed as a curved face and the annular tapered bottom wall 16b and the inner peripheral surface 10b are smoothly continued to each other through this transit junction 10c, an undesirable reduction in strength of the transit junction 10c, which would result from concentration of stresses when a force tending to separate the inner race segment 10 away from the hub axle 9 acts, can be suppressed.

Also, since the transit junction 10c, delimited between the inboard-oriented tapered bottom wall 16b of the wall thinning counterbore 16 in the inner race segment 10 and the inner peripheral surface 10b of the inner race segment 10, extends axially within a range off from the imaginary line Q drawn to define the ball contact angle θ, an undesirable deformation of the inner race segment 10, which would occur during the operation of the wheel support bearing assembly as a result of the use of the wall thinning counterbore 16, can be minimized and the life of the wheel support bearing assembly can be increased correspondingly.

In addition, in this wheel support bearing assembly, the raceway 4 of the hub axle 9 is heat treated to represent a hardened surface and, therefore, the rolling life can be secured. In contrast thereto, the plastically deformed portion 9b, which has been radially outwardly crimped, is left untreated with heat and, therefore, the crimping can be accomplished readily and easily. Considering that the inner race segment 10 is a small component part having the inboard raceway 4 defined therein and is mounted on the hub axle 9, the excellent rolling life and the excellent resistance to friction at the interface between the inner peripheral surface of the inner race segment 10 and the outer peripheral surface of the hub axle 9 can be obtained particularly when the inner race segment 10 is hardened in its entirety, ranging from surface to core thereof, by the use of a hardening treatment.

In the foregoing first embodiment of the present invention, the annular bottom wall 16b of the wall thinning counterbore 16 in the inner race segment 10 is turned to represent a turned face prior to being the hardening treatment effected thereto.

On the other hand, although the wall thinning counterbore 16 in the inner race segment 10 is of a size as small as possible and is hardened, to form the annular bottom wall 16b of the wall thinning counterbore 16 in the inner race segment 10 as the turned face in the manner described previously is effective to secure the required proof strength of the inner race segment 10 against separation from the hub axle 9. Also, since the annular bottom wall 16b is formed as the turned face prior to the hardening treatment, no grinding process need to be added.

Since the inner race segment 10 is a small component part having the inboard raceway 4 defined therein and is mounted on the hub axle 9, the excellent rolling life and the excellent resistance to friction at the interface between the inner peripheral surface of the inner race segment 10 and the outer peripheral surface of the hub axle 9 can be obtained particularly when the inner race segment 10 is hardened in its entirety, ranging from surface to core thereof, by the use of a hardening treatment.

Figure 3:
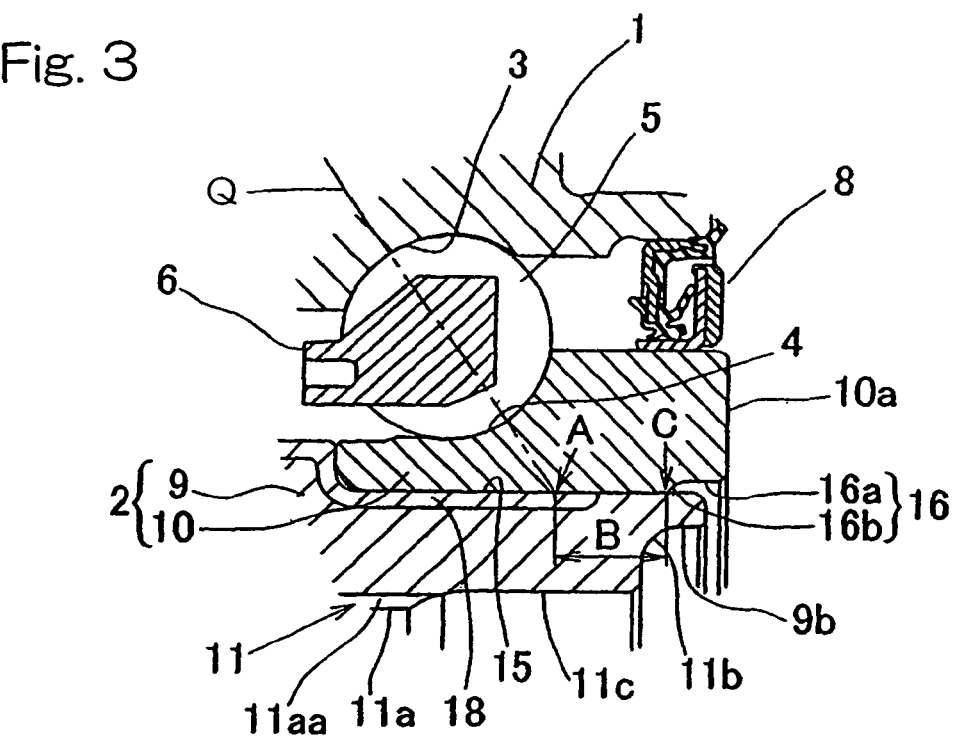
FIG. 3 is a view similar to FIG. 2, showing that portion of the wheel support bearing assembly according to a second preferred embodiment of the present invention, with an annular end of a hub axle shown in a condition prior to being radially outwardly crimped.
Figure 4:
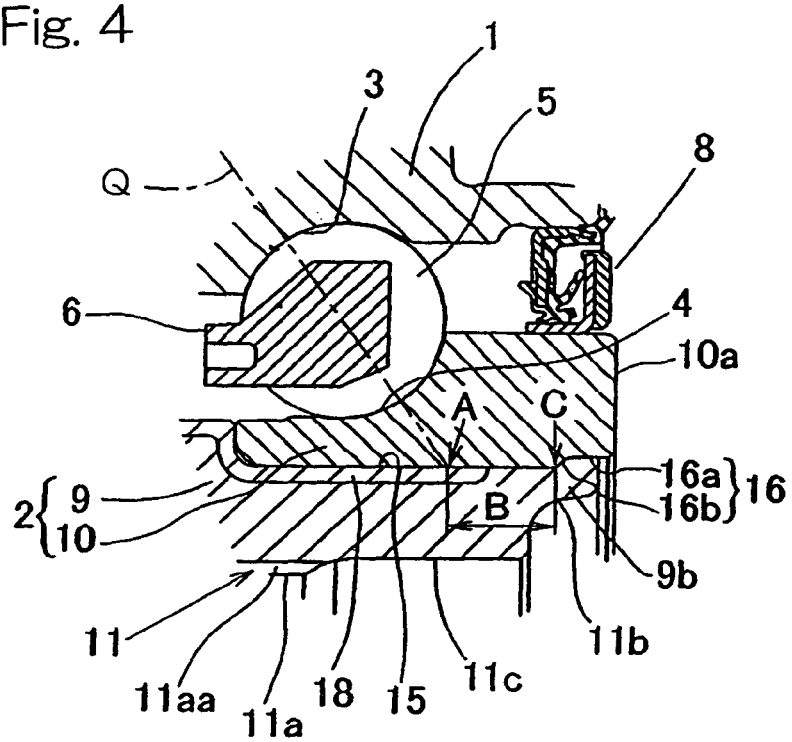
FIG. 4 is a fragmentary longitudinal sectional view showing that portion of the wheel support bearing assembly according to the second preferred embodiment of the present invention, with the annular end of the hub axle shown in a condition after having been radially outwardly crimped.

Reference will now be made to FIGS. 3 and 4 for the detailed description of a second preferred embodiment of the present invention. In the wheel support bearing assembly according to this second embodiment, a portion of the outer peripheral surface ranging from the outboard raceway 4 to the inner race mount 15 has a surface region formed as a hardened layer 18 by the use of any known induction hardening technique. The hardened layer 18 extending from the outboard raceway 4 has an inboard end terminating within the region B between a point A of intersection between the imaginary line Q drawn to define the ball contact angle θ at the inboard raceway 4 in the inner race segment 10, and the inner race mount 15 to a point C of intersection between the hub axle 9 and the annular bottom wall or abutment face 16b that is oriented axially inwards.

According to the second embodiment described above, that portion of the outer peripheral surface ranging from the outboard raceway 4 to the inner race mount 15, that is encompassed within the region B as defined above, is provided with the hardened layer 18 formed by the use of the induction hardening technique, the frictional resistance of an axle portion of the hub axle 9 can be increased during the operation of the wheel support bearing assembly. Considering that the inboard end of the hardened layer 18 is so designed as to terminate within the region B between a point A of intersection between the imaginary line Q drawn to define the ball contact angle θ at the inboard raceway 4 in the inner race segment 10, and the inner race mount 15 to a point C of intersection between the hub axle 9 and the inboard-oriented annular bottom wall or abutment face 16b, the possibility of undesirable cracks occurring in the inboard end portion of the hub axle 9 during the crimping of the inboard extremity of the hub axle 9 to form the plastically deformed portion 9b can be substantially eliminated.

Figure 5:
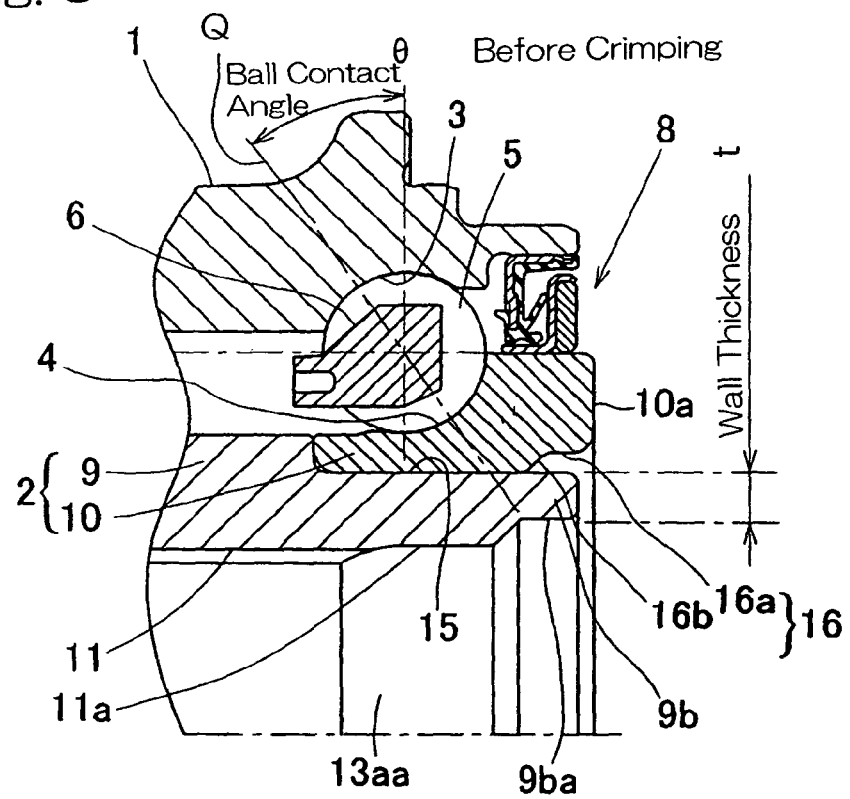
FIG. 5 is a view similar to FIG. 4, showing that portion of the wheel support bearing assembly according to a third preferred embodiment of the present invention, with the annular end of the hub axle shown in a condition prior to being radially outwardly crimped.
Figure 6:
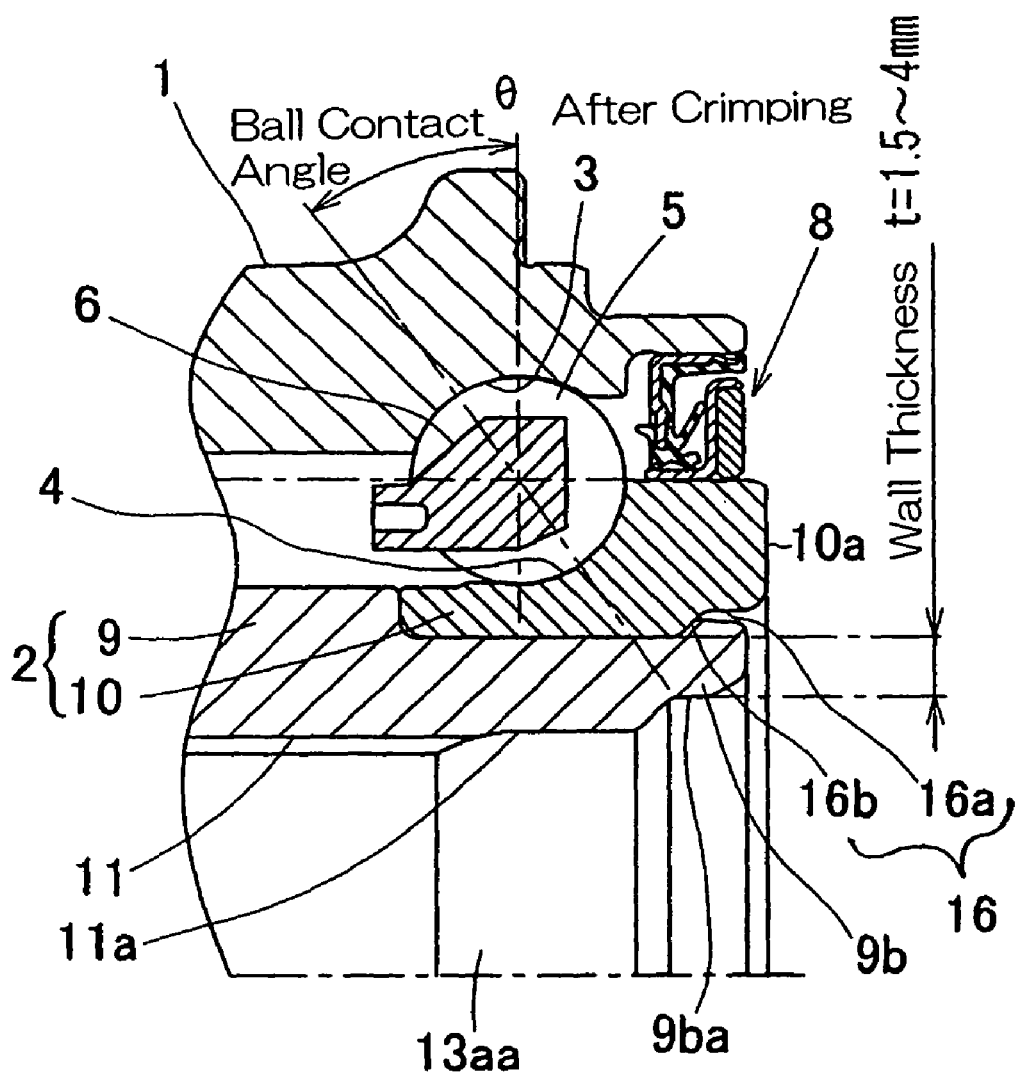
FIG. 6 is a fragmentary longitudinal sectional view showing that portion of the wheel support bearing assembly according to the third preferred embodiment of the present invention, with the annular end of the hub axle shown in a condition after having been radially outwardly crimped.

A third preferred embodiment of the present invention is shown in FIGS. 5 and 6. As best shown in FIGS. 5 and 6 on an enlarged scale, a portion of the outer peripheral surface of the hub axle 9 adjacent the inboard end thereof is radially inwardly depleted to define the inner race mount 15 of a diameter smaller than the outer diameter of the remaining portion of the hub axle 9, and the inner race segment 10 is nested or mounted on this inner race mount 15. The inner race segment 10 has a consistent inner diameter throughout the entire axial length thereof ranging from an outboard end face thereof to the inboard end face 10a thereof, it being however to be noted that that inboard inner peripheral edge portion of the inner race segment 10, which is delimited between the annular inboard end face 10a and the inner peripheral surface 10b thereof, is depleted axially inwardly of the inner race segment 10 to define the annular wall thinning counterbore 16 as hereinbefore described in connection with the first embodiment with reference to FIGS. 1 and 2. This wall thinning counterbore 16 is positioned on an inboard side with respect to the imaginary line Q drawn to define the ball contact angle between the inboard row of the balls 5 and the inboard raceway 4 defined in the inner race segment 10. This wall thinning counterbore 16 represents a generally cylindrical shape and is delimited by the peripheral wall 16a and the annular bottom wall or abutment face 16b tapered axially inwardly.

With the inner race segment 10 mounted on the inner race mount 15, the inboard extremity of the hub axle 9 is radially outwardly crimped, by the use of diameter expansion crimping technique, to define a tubular crimping wall 9b that is engaged with the inward-oriented annular bottom wall 16b of the wall thinning counterbore 16 in the inner race segment 10.

The tubular crimping wall 9b referred to above is formed when as shown in FIG. 5, the inboard extremity of the hub axle 9 is formed with a stepped surface area 9ba of a diameter greater than the diameter of the axial bore 11 in the hub axle 9, and assumes a substantially cylindrical configuration before it is crimped to extend radially outwardly. The axial range, in which the stepped surface area 9ba is formed, lies at a location on an inboard side of an outboard end of the wall thinning counterbore 16 in the inner race segment 10. Also, this tubular crimping wall 9b has an annular free end face, that does not protrude outwardly beyond the inboard end face 10a of the inner race segment 10, and has a wall thickness t within the range of 1.5 to 4 mm. It is to be noted that this tubular crimping wall 9b is left untreated with heat.

The tubular crimping wall 9b, when crimped radially outwardly, undergoes a plastic deformation to substantially fill up the wall thinning counterbore 16 in the inner race segment 10 consequently. It is, however, to be noted that a gap may be formed between an outer peripheral face of the tubular crimping wall 9b and the peripheral surface of the wall thinning counterbore 16. The diameter expansion crimping technique referred applied to the tubular crimping wall 9b is carried out over the entire circumference of the inboard extremity of the hub axle 9 by the use of a press work.

In particular, since a portion of the inner peripheral surface of the hub axle 9 corresponding in position to the tubular crimping wall 9b is radially outwardly stepped to define the stepped surface area 9ba of a diameter greater than the diameter of the axial bore 11 in the hub axle 9 and the wall thickness t of the tubular crimping wall 9b is chosen to be within the range of 1.5 to 4 mm as hereinabove described, the sufficient proof strength of the inner race segment 10 can be secured while the assemblability of the wheel support bearing assembly onto the vehicle body structure is secured by the following reasons.

Figure 9:
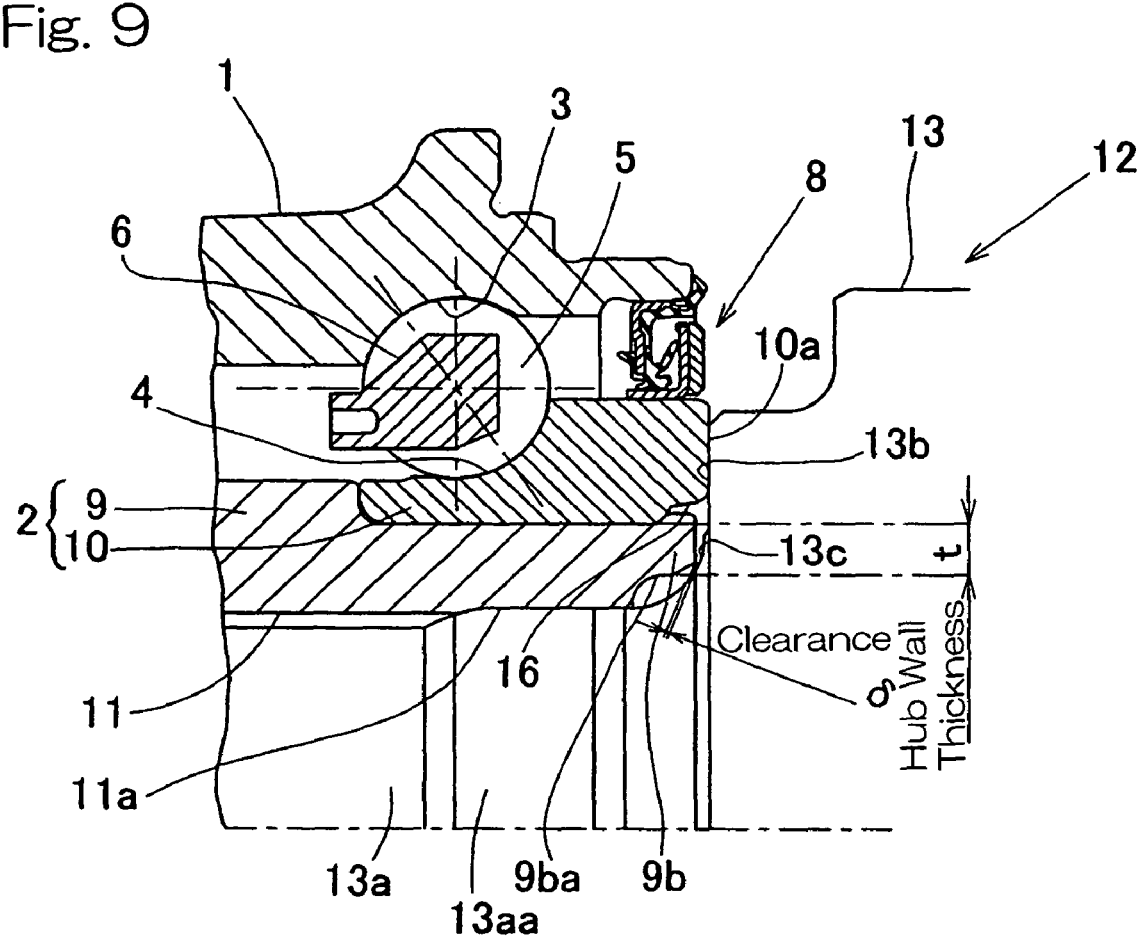
FIG. 9 is a fragmentary longitudinal sectional view of that portion of the wheel support bearing assembly, showing the interference between the annular end of the hub axle and an outer race of a constant velocity joint.

(1) Since the tubular crimping wall 9b of the hub axle 9 has an inner peripheral surface thereof formed as a radially outwardly stepped surface area 9ba of a diameter greater than the diameter of the axial bore 11 in the hub axle 9 and has a wall thickness within the range of 1.5 to 4 mm, the tubular crimping wall 9b has a reduced wall thickness enough to allow the crimping operation to be accomplished easily. Also, since the tubular crimping wall 9b has an inner periphery formed as the stepped surface area 9ba of that greater diameter, a sufficient clearance δ can be secured, when a stem portion 13a of the constant velocity joint 12 is inserted into the axial bore 11 of the hub axle 9 as shown in FIG. 9, and, accordingly, any undesirable interference brought about by a base end 13c of the stem portion 13a that has a gradually increasing diameter can advantageously be avoided. The interference brought about by the base end 13c of the stem portion 13a will result in radial push of the hub axle 9 enough to cause the inner race segment 10 to deform when the nut 14 shown in FIG. 1 is fastened onto the externally threaded outboard end of the stem portion 13. For this reason, this interference is necessarily avoided.

To quote specific dimensions, for example, where the wall thickness t of the tubular crimping wall 9b is chosen to be 4 mm or greater, the stepped surface area 9ba, which is a part of the inner peripheral surface of the tubular crimping wall 9b, will have such a reduced diameter that when the constant velocity joint 12 is coupled, no clearance 6 can be obtained, resulting in interference of the outer race 13 of the constant velocity joint 12 with the tubular crimping wall 9b. If in order to avoid this interference, the inboard-oriented annular bottom wall 16b and the tubular crimping wall 9b of the hub axle 9 are retracted towards the outboard side, the tubular crimping wall 16 will come to lie on the imaginary line Q drawn to define the ball contact angle θ, with the life reduced highly possibly.

Figure 7:
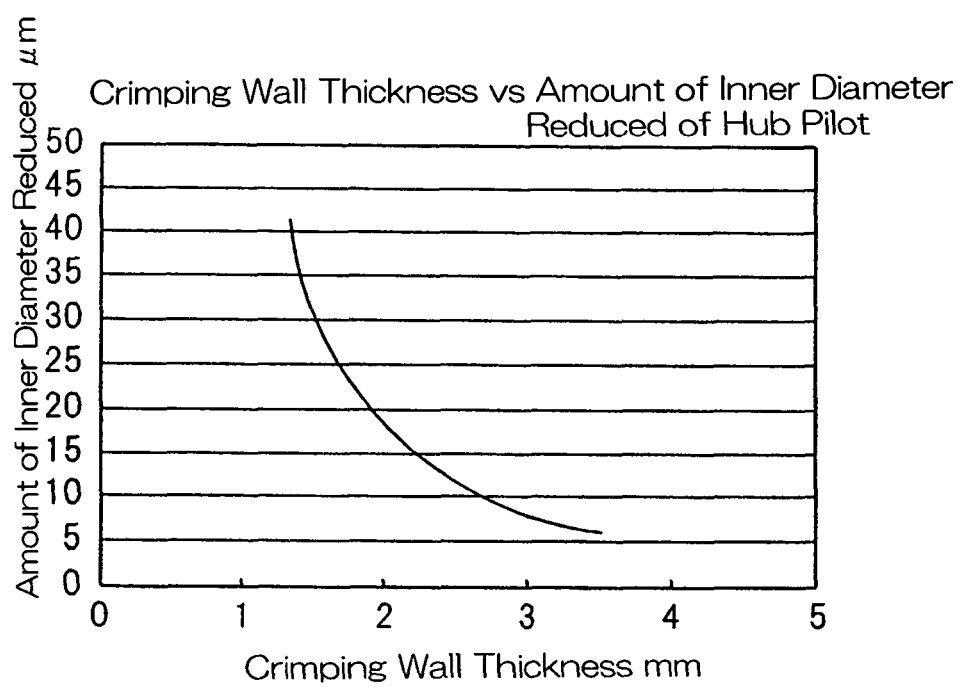
FIG. 7 is a chart showing the relation between the wall thickness of the tubular crimping wall of the hub axle and the amount to which the inner diameter of a hub pilot area of the hub axle has been reduced.

(2) When the tubular crimping wall 9b of the hub axle 9 is radially outwardly crimped, a hub pilot area 11a defining an entrance to the axial bore 11 of the hub axle 9 may have its inner diameter reduced. In such case, as shown in the chart of FIG. 7 showing the relationship between the wall thickness t of the tubular crimping wall 9b and the amount of the inner diameter of the hub pilot area 11a that is reduced when the tubular crimping wall 9b is radially outwardly crimped, the amount of the inner diameter of the hub pilot area 11a reduced increases with decrease of the wall thickness t of the tubular crimping wall 9b. The mechanism of the reduction of the diameter is described in detail as follows. As a result of the radially outward crimping of the tubular crimping wall 9b, the outer diameter of the inner race mount 15 in the hub axle 9 slightly expands radially. However, since the inner race segment 10 has already been mounted on the inner race mount 15, the hub axle 9 radially inwardly constricts by the effect of the annular rigidity (the rigidity in a radial direction) of the inner race segment 10, resulting in reduction of the inner diameter of the hub pilot area 11a. In such case, since the rigidity of the inner race segment 10 increases relatively with decrease of the wall thickness t of the tubular crimping wall 9b, the amount of the inner diameter of the hub pilot area 11a reduced increases.

Considering the gap between the inner diameter of the hub pilot area 11a and the outer diameter of a pilot area 13aa of the stem portion of the constant velocity joint 12, which engages the hub pilot area 11a, selection of the wall thickness t of a value smaller than 1.5 mm will result in increase of the inner diameter of the hub pilot area 11a reduced, making it difficult to insert the stem portion 13a of the constant velocity joint 12. Accordingly, the lowermost limit of the wall thickness t must be 1.5 mm.

Figure 8:
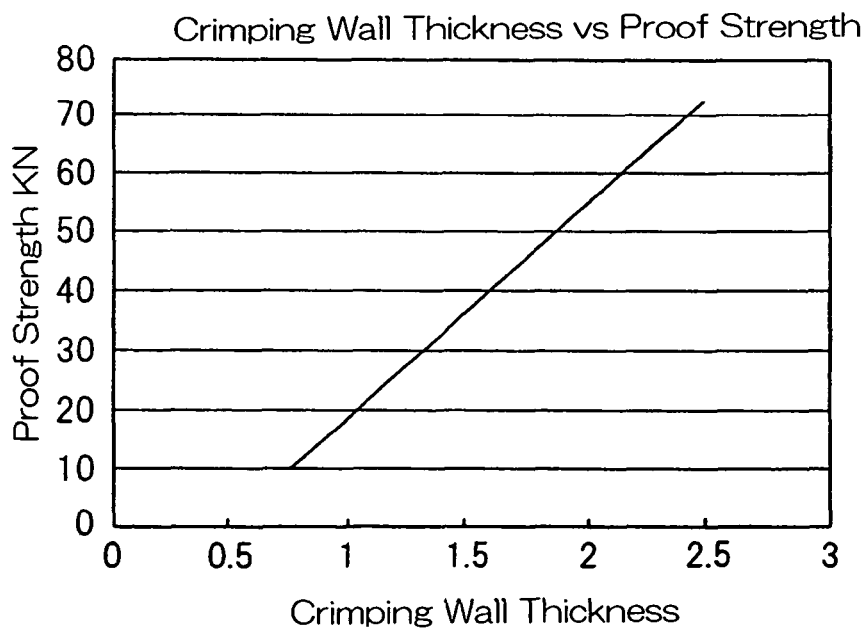
FIG. 8 is a chart showing the relation between the wall thickness of the tubular crimping wall of the hub axle and the proof strength against separation of an inner race.

On the other hand, the wall thickness t of the tubular crimping wall 9b affects the proof strength of the inner race segment 10 during assemblage of the wheel support bearing assembly on the vehicle body structure and, as shown in FIG. 8, the proof strength decreases with decrease of the wall thickness t. However, if the wall thickness t is 1.5 mm or more, the proof strength of the inner race segment 10 can be secured sufficiently.

By the reasons discussed above, the wall thickness t of the tubular crimping wall 9b is preferably so chosen as to be within the range of 1.5 to 4 mm in order to secure the sufficient proof strength of the inner race segment 10.

As discussed above, in the wheel support bearing assembly of the structure according to the third embodiment of the present invention, the undesirable separation of the inner race segment 10 during the assemblage of the wheel support bearing assembly on the vehicle body structure can be advantageously prevented without the bearing function being adversely affected.

Figure 10:
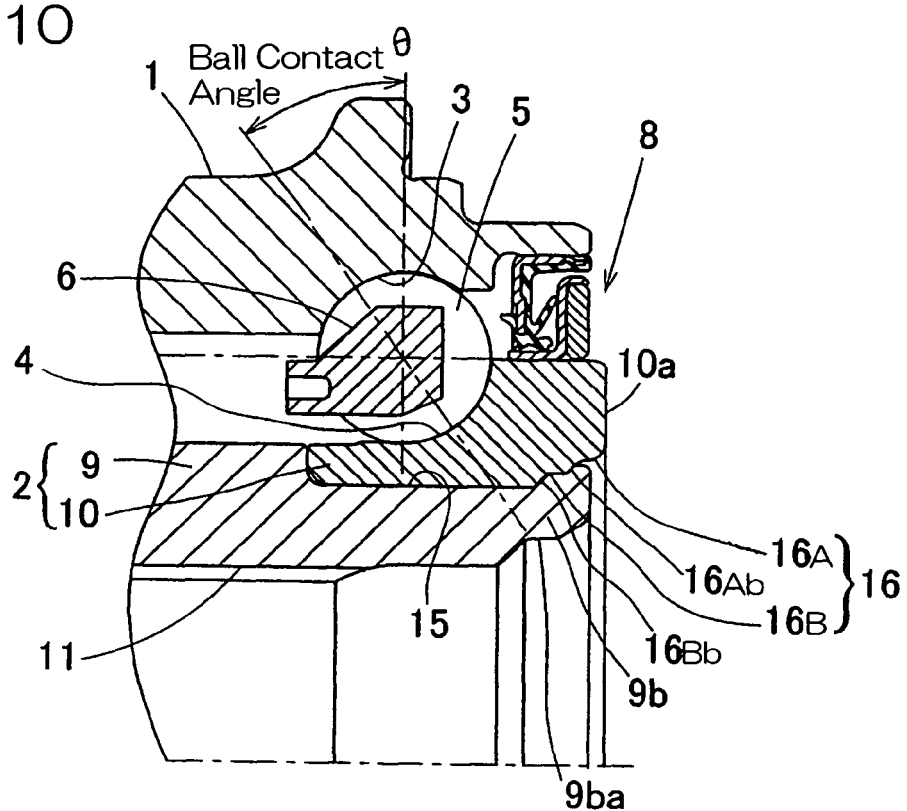
FIG. 10 is a fragmentary longitudinal sectional view showing that portion of the wheel support bearing assembly according to a fourth preferred embodiment of the present invention.

Referring now to FIG. 10, the wheel support bearing assembly according to a fourth preferred embodiment of the present invention will be described in detail. As shown in a fragmentary enlarged sectional view in FIG. 10, the wall thinning counterbore 16 defined in the inner race segment 10 at a location adjacent the inboard end thereof is of a configuration stepped radially outwardly in two stages, including a large diameter counterbore portion 16A, defined adjacent the inboard end of the inner race segment 10, and a reduced diameter counterbore portion 16B defined on one side of the large diameter counterbore portion 16A remote from the inboard end of the inner race segment 10. The inboard end portion of the hub axle 9 is provided with a plastically deformed portion 9b which is, when plastically deformed, brought into engagement with axially oriented annular faces 16Ab and 16Bb of the large and reduced diameter counterbore portions 16A and 16B, respectively.

In the wheel support bearing assembly of the structure according to the fourth embodiment described above, since the wall thinning counterbore 16 in the inner race segment 10 is radially outwardly stepped in two stages to define the large diameter counterbore portion 16A and the reduced diameter counterbore portion 16B such that the eventually formed plastically deformed portion 9b can be brought into engagement with the axially oriented annular faces 16Ab and 16Bb, respectively, the proof strength of the annular race segment 10 can be increased as compared with the case, in which the wall thinning counterbore is stepped in one stage radially outwardly, and, therefore, an undesirable separation of the inner race segment 10 from the hub axle 6, which would otherwise occur under the influence of an external force generated during the mounting of the wheel support bearing assembly on the vehicle body structure, can be assuredly prevented.

Figure 11:
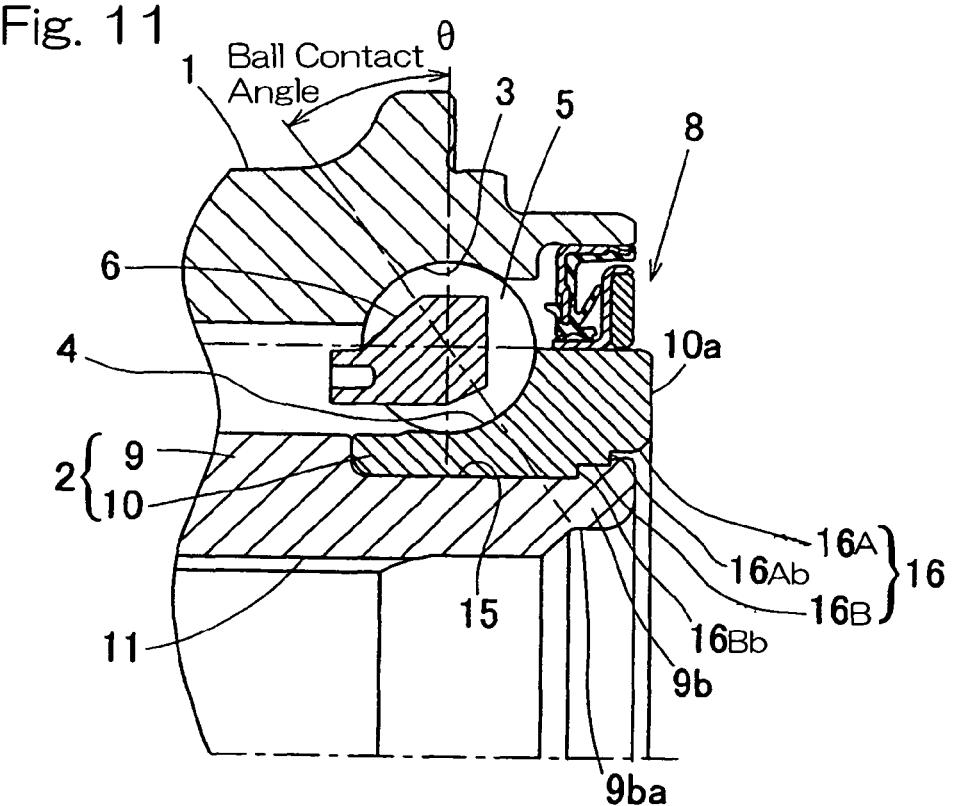
FIG. 11 is a view similar to FIG. 10, showing a modified form of the wheel support bearing assembly.

FIG. 11 illustrates a modified form of the wheel support bearing assembly according to the fourth embodiment described above. In this modified wheel support bearing assembly, the axially oriented faces 16Ab and 16Bb of the large and reduced diameter counterbore portions 16A and 16B, respectively, are so modified as to define a radially lying faces that are perpendicular to the longitudinal axis of the inner race segment 10.

Other structural features of the modified wheel support bearing assembly than those described above are substantially similar to those shown in and described with reference to FIG. 10 and, therefore, the details thereof are not reiterated for the sake of brevity.

It is to be noted that although in describing any one of the foregoing embodiments, the plastically deformed portion 9b has been shown and described as engaged with only the axially oriented faces 16Ab and 16Bb of the large and reduced diameter counterbore portions 16A and 16B of the wall thinning counterbore 16, the plastically deformed portion 9b may be brought into engagement with respective inner peripheral faces of the large and reduced diameter counterbore portions 16A and 16B as well.

Figure 12:
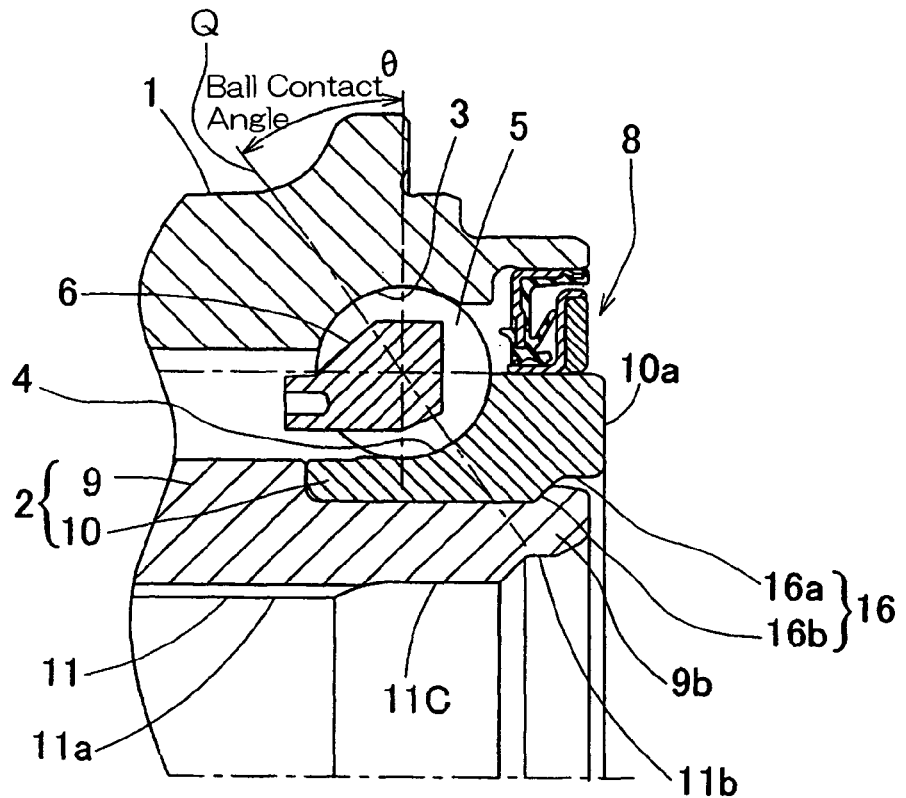
FIG. 12 is a fragmentary longitudinal sectional view showing that portion of the wheel support bearing assembly according to a fifth preferred embodiment of the present invention.

The wheel support bearing assembly according to a fifth preferred embodiment of the present invention will be described in detail with particular reference to FIG. 12. As shown in a fragmentary enlarged view in FIG. 12, the wall thinning counterbore 16 has an inner peripheral surface made up of a straight surface portion (bottom face) 16a in the form of a cylindrical surface portion and an annular tapered surface portion (abutment face) 16b defining a radial step that intervenes between the straight surface portion 16a and the inner peripheral surface of the inner race segment 10. The annular tapered surface portion 16b referred to above is positioned on the inboard side with respect to the imaginary line Q drawn to define the ball contact angle (the contact angle of the rolling element). It is, however, to be noted that instead of the annular tapered surface portion 16b, the intervening radial step may be in the form of a surface portion lying perpendicular to the axial direction of the inner race segment 10.

The plastically deformed portion 9b provided in the inboard end portion of the hub axle 9 when so defined is kept spaced a distance from the straight surface portion 16a of the wall thinning counterbore 16 in the inner race segment 10.

As hereinabove described, since the inner peripheral surface of the wall thinning counterbore 16 in the inner race segment 10 is so configured as to be defined by the straight surface portion 16a in the form of a cylindrical surface and the annular tapered surface portion 16b intervening between the straight surface portion 16a and the inner peripheral surface of the inner race segment 10 and, on the other hand, the plastically deformed portion 9b integral with the hub axle 9 is spaced a distance from the straight surface portion 16a of the wall thinning counterbore 16, it is possible to minimize the amount of the diameter of the inner race segment 10 that is increased when the plastically deformed portion 9b is radially outwardly crimped by the use of a diameter expansion crimping technique. Because of this, not only can the inboard raceway 4 of the inner race segment 10 be kept free from adverse influence brought about by the diameter expansion crimping technique, but a possible reduction of the bearing function such as reduction of the life otherwise brought about by the deformation of the inboard raceway 4 of the inner race segment 10 can also be avoided.

Figure 13:
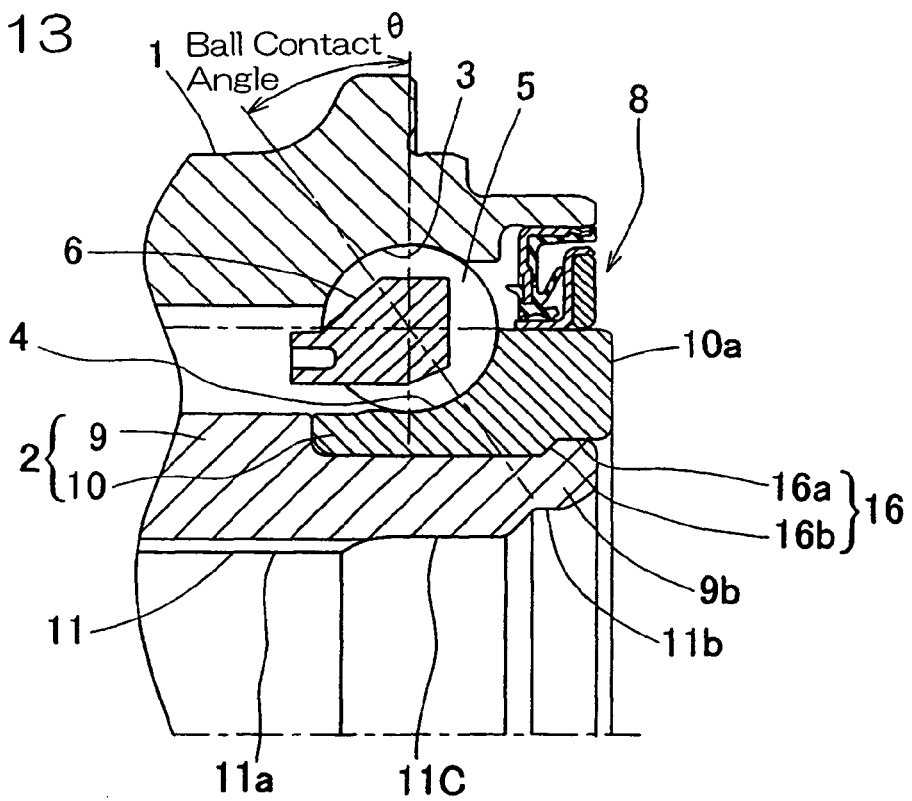
FIG. 13 is a view similar to FIG. 12, showing an comparative example of wheel support bearing assembly shown for the purpose of comparison with the wheel support bearing assembly of FIG. 12.

As is the case with the wheel support bearing assembly shown in FIG. 13 for comparison purpose, if the plastically deformed portion 9b of the hub axle 9 were to be held in contact with the straight surface portion 16a of the wall thinning counterbore 16, the inner race segment 10 will be pushed radially outwardly by the effect of the crimping technique applied to the plastically deformed portion 9b to such an extent as to result in an undesirable increase of the diameter of the inner race segment 10, with the inboard raceway groove 4 in the inner race segment 10 consequently likely to be deformed.

However, this undesirable deformation can advantageously be avoided according to the present invention when the plastically deformed portion 9b is spaced from the straight surface portion 16a of the wall thinning counterbore 16.

Figure 14:
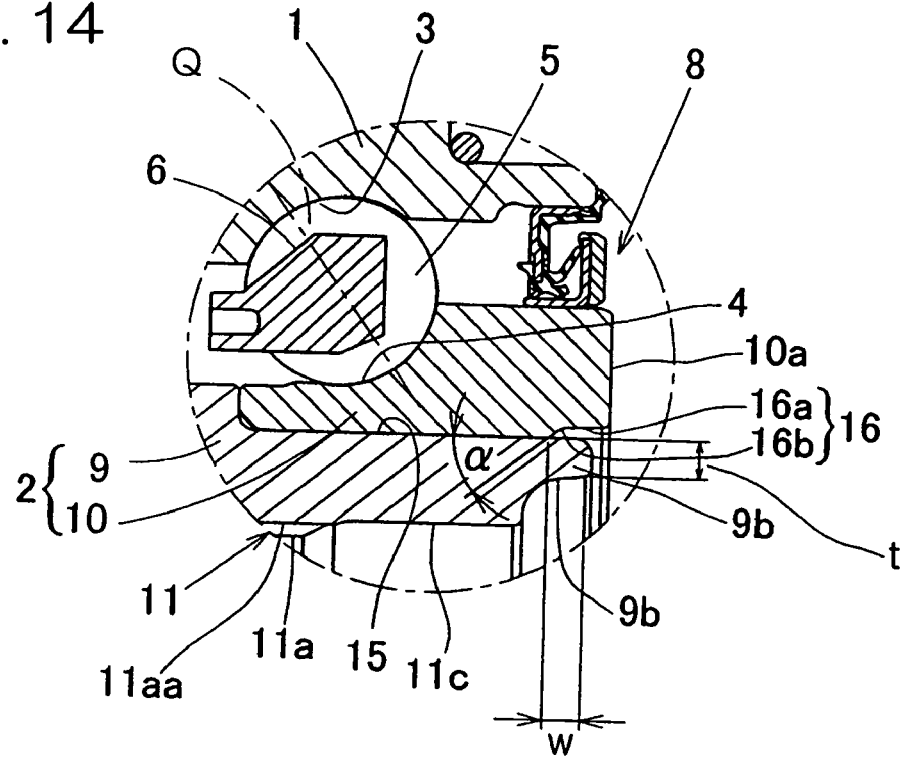
FIG. 14 is a fragmentary longitudinal sectional view showing that portion of the wheel support bearing assembly according to a sixth preferred embodiment of the present invention, with the annular end of the hub axle shown in a condition prior to being radially outwardly crimped.
Figure 15:
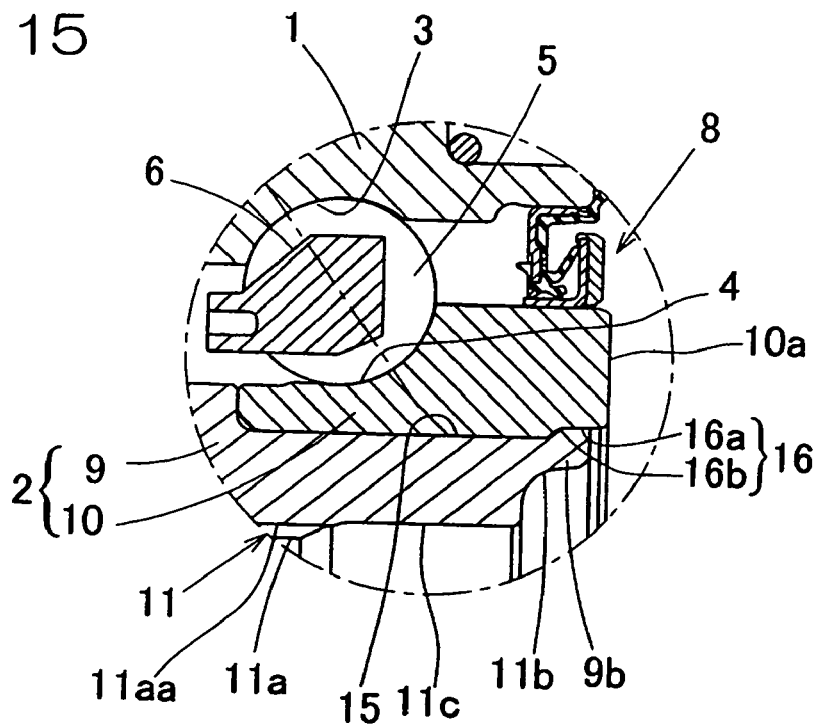
FIG. 15 is a view similar to FIG. 14, showing that portion of the wheel support bearing assembly according to the sixth preferred embodiment of the present invention, with the annular end of the hub axle shown in a condition after having been radially outwardly crimped.

Sixth Embodiment (FIGS. 14 and 15)

With particular reference to FIGS. 14 and 15, a sixth preferred embodiment of the present invention will be described in detail. As best shown in FIGS. 14 and 15, the wall thinning counterbore 16 has an inner peripheral surface made up of a straight surface portion 16a in the form of a cylindrical surface portion and an annular tapered surface portion 16b intervening between the straight surface portion 16a and the inner peripheral surface of the inner race segment 10 and inclined at an angle $\alpha$ of 12° or more relative to the longitudinal axis O of the wheel support bearing assembly (See FIG. 1.).

Since in this embodiment the annular tapered surface portion 16b is chosen as a surface with which the plastically deformed portion 9b is engaged in the wall thinning counterbore 16, as compared with the case in which this surface portion 16b were to be formed as a radially perpendicularly lying surface, the plastically deformed portion 9b of the hub axle 9 undergoes a plastic deformation to engage the annular tapered surface portion 16b with no gap formed between it and the annular tapered surface portion 16b, when the plastically deformed portion 9b is radially outwardly crimped by the use of the crimping technique, and therefore the engagement thereof in the wall thinning counterbore 16 will exhibit a high reliability. For this reason, radial outward crimping of the plastically deformed portion 9b can easily be accomplished. In such case, however, if the angle of inclination $\alpha$ of the annular tapered surface portion 16b relative to the longitudinal axis O of the wheel support bearing assembly becomes smaller, it appears that the proof strength of the inner race segment 10 will be lowered.

Figure 16:
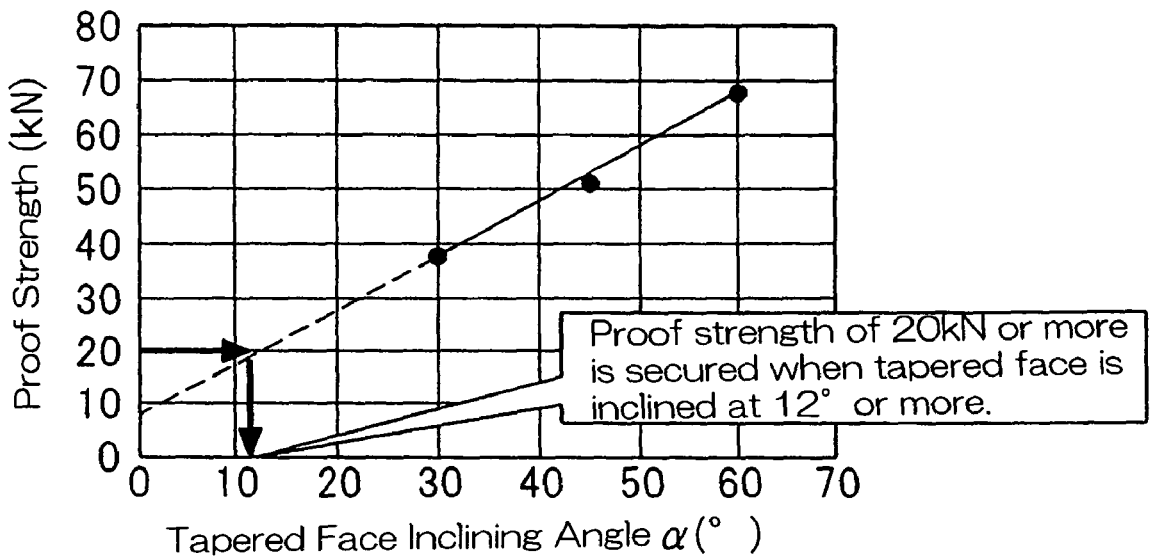
FIG. 16 is a chart showing the relationship between the angle of inclination of an annular tapered bottom wall in the hub axle and the proof strength of an inner race segment.

However, in the embodiment shown in and described with reference to FIGS. 14 and 15, since the angle of inclination $\alpha$ of the annular tapered surface portion is set to a value equal to or greater than 12°, the requires proof strength of the inner race segment 10 can be obtained. More specifically, in order to prevent the inner race segment 10 from axially separating from the inner race mount 15 during the mounting of the wheel support bearing assembly on the vehicle body structure, it has experimentally ascertained that the proof strength equal to or greater than 2 tons or more is required. When a series of experiments were conducted to ascertain the relation between the proof strength of the inner race segment and the angle of inclination $\alpha$ of the annular tapered surface portion 16b when such inclination angle was chosen to be 30°, 45° and 60°, the proof strengths plotted in the chart of FIG. 16 was obtained. As can readily be understood from the chart of FIG. 16, it is assumed that if the inclination angle α of the annular tapered surface portion 16b is chosen to be 12° or greater, the proof strength of a required value equal to or greater than 2 tons could be obtained.

It is to be noted that the wheel support bearing assembly, particularly, the third generation type, is suitably used in general passenger cars particularly ranging from compact cars to limousines. Accordingly, so long as the wheel support bearing assembly of the present invention is designed for use in such general passenger cars, the inclination angle α of the annular tapered surface portion 16b discussed above is preferred to be 12°.

Also, in the wheel support bearing assembly designed for use in the general passenger cars, the axial length W, within which the plastically deformed portion 9b is received within the wall thinning counterbore 16 in the inner race segment 10, is 0.25 mm or more and the radial depth within which the plastically deformed portion 9b is received within the wall thinning counterbore 16 is within the range of 0.15 to 0.45 mm. The wall thinning counterbore 16 in the inner race segment 10 has a depth preferably within the range of 0.4 to 2.5 mm.

Figure 17:
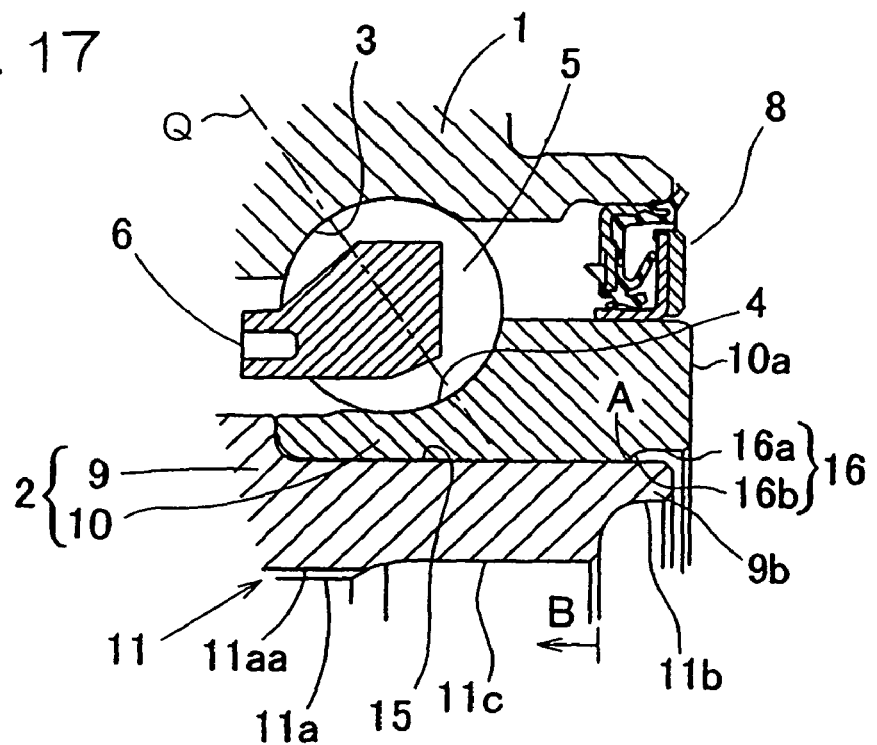
FIG. 17 is a fragmentary longitudinal sectional view showing that portion of the wheel support bearing assembly according to a seventh preferred embodiment of the present invention, with the annular end of the hub axle shown in a condition prior to being radially outwardly crimped.

The wheel support bearing assembly according to a seventh preferred embodiment of the present invention will now be described in detail with particular reference to FIGS. 17 to 19. As best shown in enlarged sectional representations in FIGS. 17 and 19, the inboard end portion of the hub axle 9 is provided with an plastically deformed portion 9b which is, when radially outwardly crimped by the use of the crimping process, brought into contact with an axially oriented stepped face 16b defined in the wall thinning counterbore 16 of the inner race segment 10. FIG. 17 illustrates the plastically deformed portion 9c having not yet been crimped radially outwardly, whereas FIG. 19 illustrates the plastically deformed portion 9c having been crimped radially outwardly. This plastically deformed portion 9b, although substantially filling up the wall thinning counterbore 16 of the inner race segment 10, does not protrude outwardly from the inboard end face 10a of the inner race segment 10 and has a hardness of HRC 28 or lower.

Figure 18:
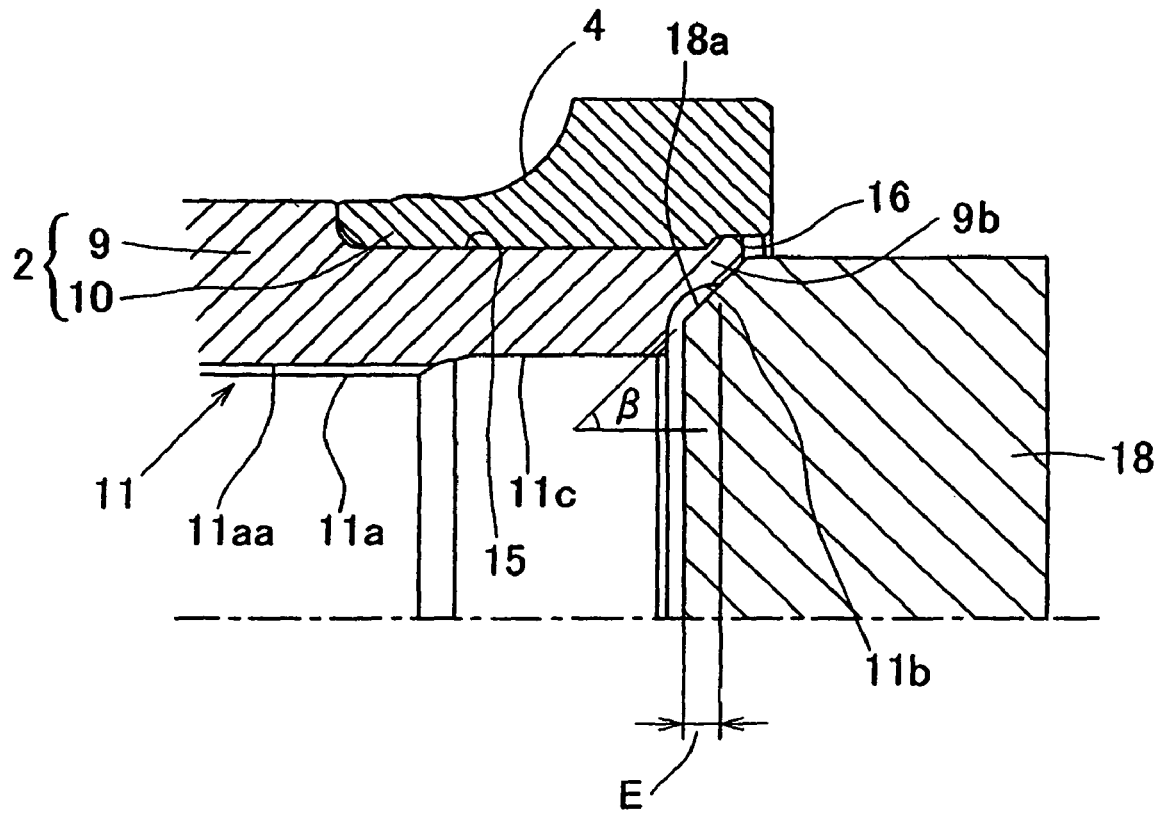
FIG. 18 is a fragmentary longitudinal sectional view showing that portion of the wheel support bearing assembly of FIG. 17 on a further enlarged scale, with the annular end of the hub axle shown in a condition prior to being radially outwardly crimped.
Figure 19:
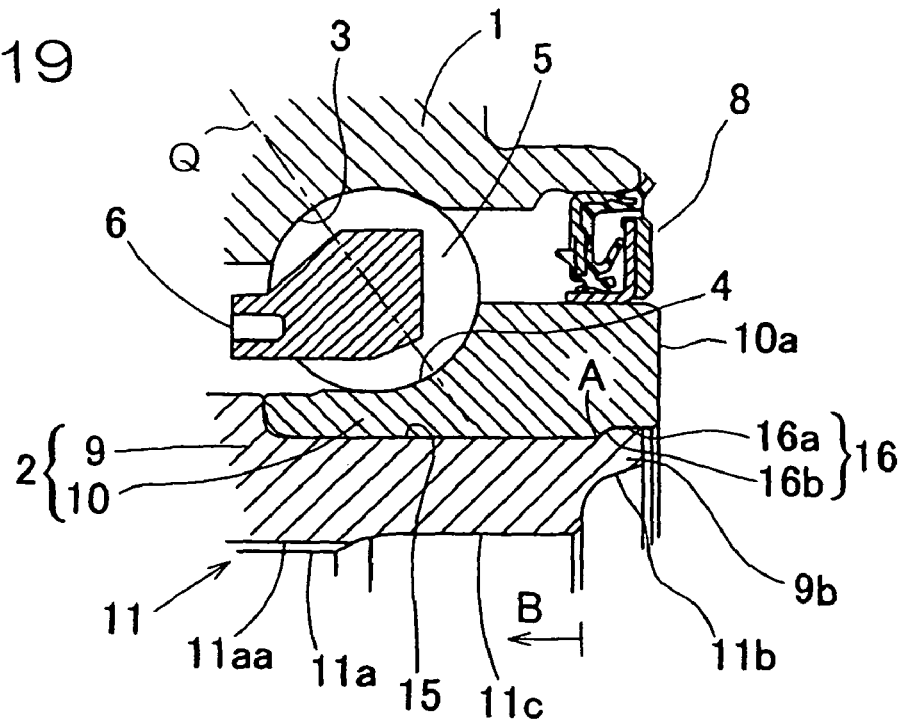
FIG. 19 is a fragmentary longitudinal sectional view showing that portion of the wheel support bearing assembly according to the seventh preferred embodiment of the present invention, with the annular end of the hub axle shown in a condition after having been radially outwardly crimped.

The crimping process referred to above is carried out by the use of a crimping die 18 as shown FIG. 18. The crimping die 18 is of a design having a free end edge portion tapered to define an annular abutment face 18a that is adapted to be held in abutment with an open edge of a cylindrical inner periphery of the plastically deformed portion 9b. When an external force is applied to the crimping die 18 while the annular abutment face 18a of the crimping die 18 is held in abutment with the open edge of the cylindrical inner periphery of the plastically deformed portion 9b, a cylindrical portion of the plastically deformed portion 9b is expanded radially outwardly to thereby complete the crimping process. In order to enable the crimping process and to achieve a continuous crimping, the crimping die 18 must have a hardness at least higher than the hardness of the plastically deformed portion 9b. Accordingly, in the illustrated embodiment now under discussion, the crimping die 18 is made of a metallic material of a hardness of, for example, HRC 30 or higher, such as, for example, steel or cemented carbide. Alternatively, the crimping die 18 may be made of a material that is surface treated to have a required hardness. The annular abutment face 18a of the crimping die 18 preferably has a surface roughness equal to or lower than Ra 1 μm.

As is the case with the previously described sixth embodiment, the inner peripheral surface of the hub axle 9 defining the axial bore 11 includes a general diameter bore portion 11a, where the splined grooves 11aa are formed, and a two-stage stepped portion situated on an inboard side of the general diameter bore portion 11a. The two-stage stepped portion referred to above is radially stepped in two stages and in turn includes a large diameter bore portion 11b on the inboard side and an intermediate diameter bore portion 11c of a diameter smaller than that of the large diameter bore portion 11b, but greater than the maximum diameter of the general diameter bore portion 11a as measured in the circle depicted in touch with bottoms of the splined grooves 11a. The intermediate diameter bore portion 11c referred to above is located at a position B axially deep from the axial position A of the wall thinning counterbore 16 of the inner race segment 10.

In the wheel support bearing assembly according to the seventh embodiment described above, since the inboard end portion of the axial bore 11 of the hub axle 9 on the inboard side of the general diameter bore portion 11a thereof is radially stepped in two stages as hereinabove described, the intermediate diameter bore portion 11c serves as a guide for guiding the stem portion 13a of the constant velocity joint when such stem portion 13a is to be inserted into the axial bore 11, resulting in increase of the assemblability.

Also, the intermediate diameter bore portion 11c is situated at the position B axially deep from the axial position A of the wall thinning counterbore 16 in the inner race segment 10. Accordingly, even when the crimping die 18 is inserted with its leading end moved deep past the plastically deformed portion 9b at the time the plastically deformed portion 9b is to be radially outwardly crimped with the use of the crimping die 18, the crimping die 18 will not interfere with the intermediate diameter bore portion 11c, allowing the crimping process to be performed smoothly. For this reason, for the crimping die 18, the one having that peripheral edge portion of the leading end thereof tapered to define the annular abutment face 18a can be suitably employed and, also, molding of the plastically deformed portion 9b is possible with a low processing load and, accordingly, the load which would be imposed on the raceways 3 and 4 and the balls 5 during the crimping can advantageously be minimized.

Considering that in the foregoing seventh embodiment, the hardness of the plastically deformed portion 9b is chosen to be HRC 28 or lower, the crimping process can be accomplished with a low processing load.

Since the radially outward crimping of the plastically deformed portion 9b is carried out by, while the plastically deformed portion 9b before it is radially outwardly crimped has its inner periphery representing a cylindrical shape and therefore, forms a part of the axial bore 11 of the hub axle 9, causing the annular tapered abutment face 18a of the crimping die 18 to be held in abutment with the open edge of the inner periphery of the cylindrical portion, and radially outwardly crimping that cylindrical portion to cause the latter to have an increased inner diameter to thereby complete formation of the plastically deformed portion 9b, the crimping process can be accomplished with a low processing load.

Since during this crimping process the crimping die 18 is held in abutment with the plastically deformed portion 9b under a high pressure, there is a risk that depending on the process condition, the appearance of the plastically deformed portion 9c will be impaired with galling and/or adhesion and, in the worst case it may happen, the crimping process will be no longer performed. However, since in the embodiment described above, the tubular abutment face 18a of the crimping die 18 has a surface roughness equal to or lower than Ra 1 µm as hereinbefore described, the crimping can be accomplished smoothly without the appearance of the plastically deformed portion 9b being impaired with galling and/or adhesion and/or without processing inconveniences occurring.

Also, in the practice of the crimping process discussed above, the annular abutment face 18a of the crimping die 18 is inclined at an angle β (See FIG. 18.) within the range of 5° to 60°.

Although the crimping process is possible with a low processing load if the angle of inclination β of the annular abutment face 18a of the crimping die 18 is small, the smaller angle of inclination β requires the leading end portion of the crimping die 18, that is inserted deep beyond the cylindrical portion 11b forming a part of the inner peripheral surface of the plastically deformed portion 9c, to have an increased length E. For this reason, in order to avoid an undesirable interference between the crimping die 18 and an end face on the side of the intermediate diameter bore portion 11c in the large diameter bore portion 11b of the axial bore 11 of the hub axle 9, the shape of the product is restricted. In view of this inconvenience, selection of the angle of inclination β of the annular abutment face 18 within the range of 5° to 60° is preferred in order to avoid the above discussed interference and to enable the crimping process to be accomplished with the low processing load.

Figure 20:
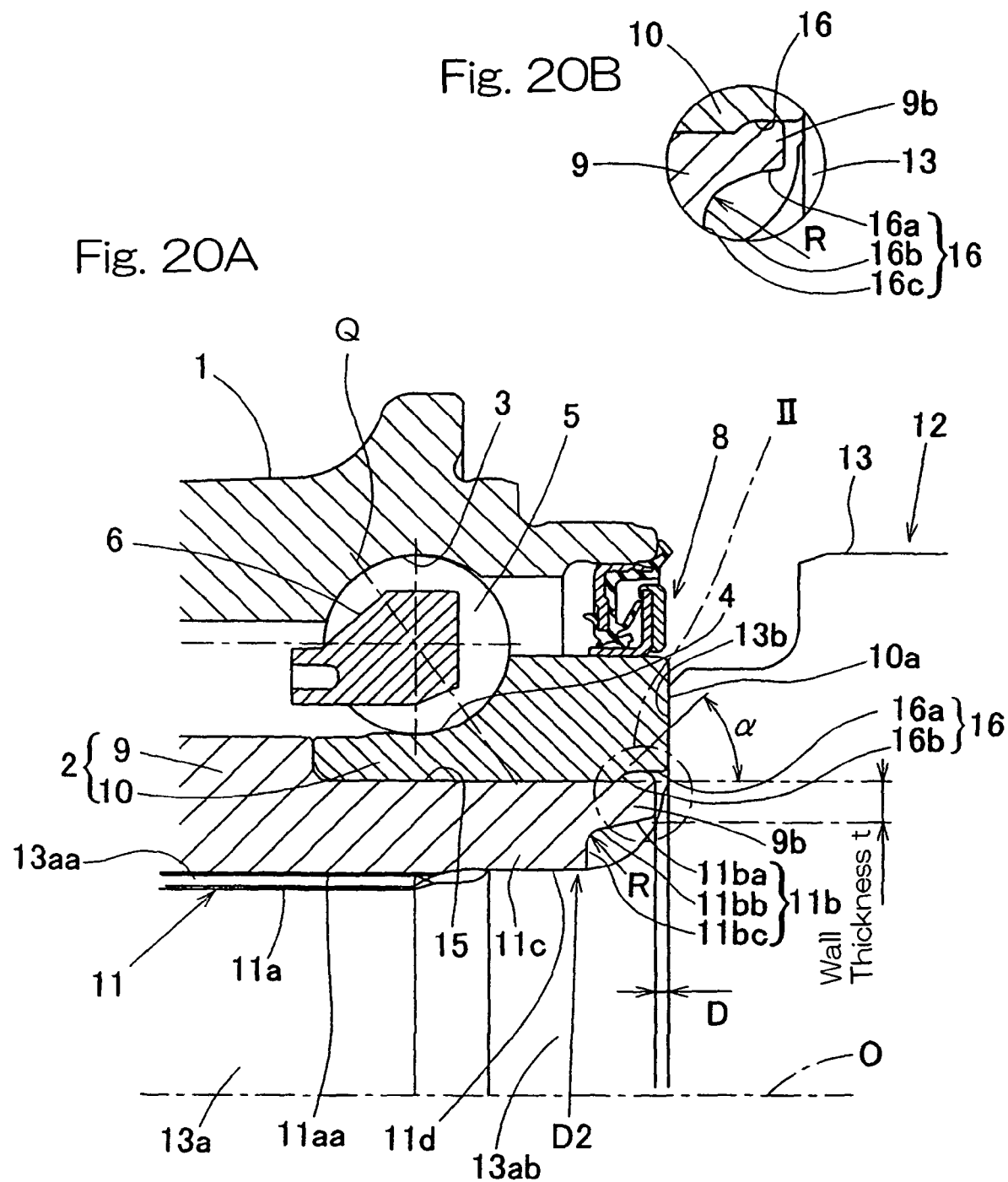
FIG. 20A is a fragmentary longitudinal sectional view showing that portion of the wheel support bearing assembly according to an eighth preferred embodiment of the present invention.
FIG. 20B is a fragmentary sectional view showing, on an enlarged scale, a portion of the wheel support bearing assembly which is encompassed in the circle depicted in FIG. 20A.
Figure 23:
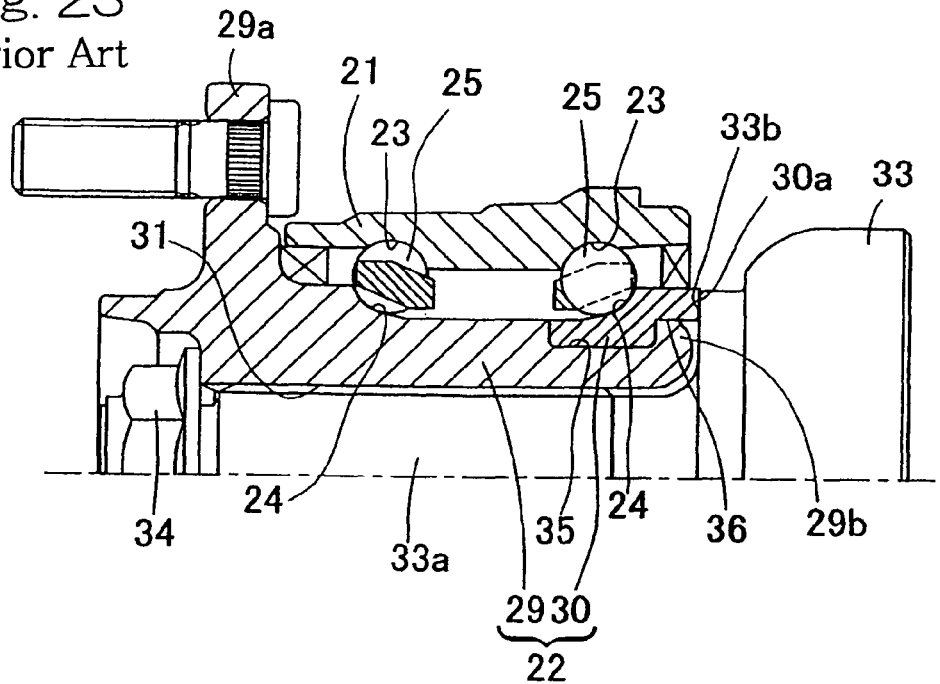
FIG. 23 is a fragmentary longitudinal sectional view of the conventional wheel support bearing assembly.
Figure 24:
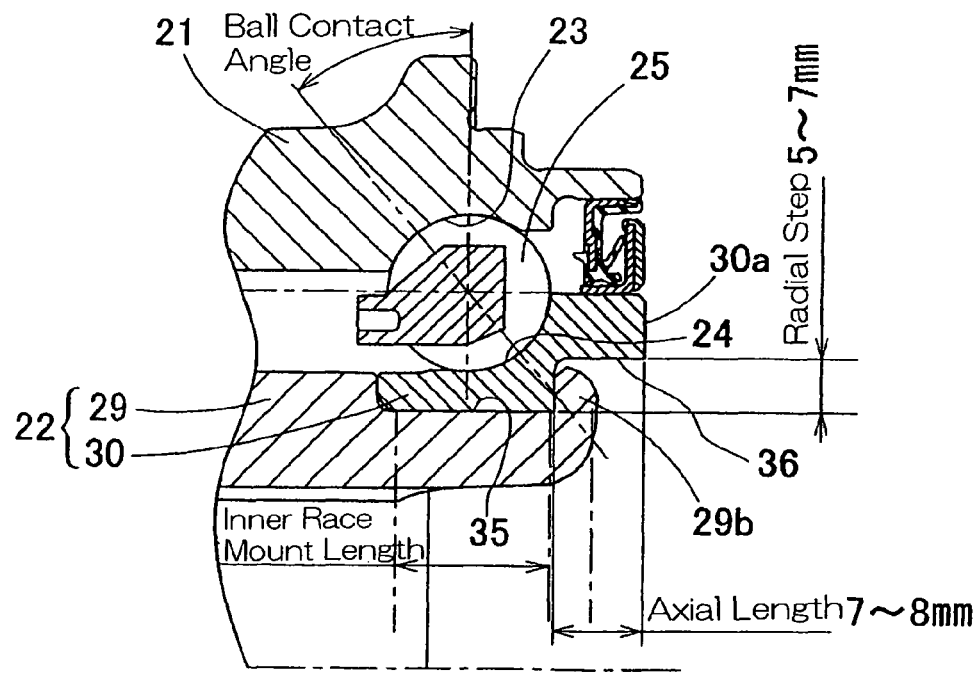
FIG. 24 is a fragmentary longitudinal sectional view of a portion of the conventional wheel support bearing assembly shown on an enlarged scale.

FIGS. 20 to 22 pertain to the wheel support bearing assembly according to an eighth preferred embodiment of the present invention, reference to which will now be made for the detailed description thereof. As best shown in an enlarged sectional representation in FIG. 20, the inboard end portion of the hub axle 9 is provided with a tubular crimping wall 9b that is, when radially outwardly crimped, brought into contact with the abutment face 16b in the wall thinning counterbore 16 of the inner race segment 10. This tubular crimping wall 9b substantially fills up the wall thinning counterbore 16 of the inner race segment 10.

The tubular crimping wall 9b referred to above is formed when the inboard extremity of the hub axle 9 is formed with a wall thinning counterbore portion 11b of a diameter greater than the diameter of the axial bore 111 in the hub axle 9 and assumes a substantially cylindrical configuration as shown in FIG. 22 before it is crimped to extend radially outwardly. After having been radially outwardly crimped, the tubular crimping wall 9b assumes such a shape as shown in FIG. 20B, in which the inner peripheral surface thereof is tapered in a direction counter to the inboard side, that is, flared axially outwardly towards the inboard side. The axial range in which the tubular crimping wall 9b is defined extends from a position somewhat on the outboard side of an outboard end of the wall thinning counterbore 16 of the inner race segment 10 to a position in the vicinity of the inboard end face 10a of the inner race segment 10. The distance D over which the tubular plastically deformed portion 9b is retracted axially from the inboard end face 10a of the inner race segment 10 towards the outboard side, that is, set back axially inwardly from the inboard end face 10a of the inner race segment 10, is chosen to be, for example, about 1.0 mm.

The tubular crimping wall 9b has a wall thickness t which is, for example, 1.5 mm and the annular abutment face 16b in the form of a tapered face in the wall thinning counterbore 16 of the inner race segment is inclined at an angle α of 45° relative to the longitudinal axis O of the bearing assembly.

The hub axle 9 in its entirety is shown in a longitudinal sectional representation in FIG. 21, and a portion of this hub axle 9 encompassed within the phantom ellipse in FIG. 21 is shown on an enlarged scale in FIG. 22A. As shown in those figures, the wall thinning counterbore portion 11b has an inner surface delimited by a cylindrical surface region 11ba, a radially lying annular surface region 11bc and a generally arcuate transit surface region 11bb intervening between the cylindrical surface region 11ba and the radially lying annular surface region 11bc. The generally arcuate transit surface region 11bb referred to above has a radius of curvature R which is shown as 2.0 mm, but may be 1.9 mm or more. It is to be noted that the radius of curvature R referred to above remains 1.9 mm or more even after the tubular crimping wall 9b has been radially outwardly crimped as shown in FIGS. 20A and 20B.

According to the eighth embodiment of the present invention, since the inner periphery of the tubular crimping wall 9b is provided with the wall thinning counterbore portion 11b of a diameter greater than that of the axial bore 11 of the hub axle 9 and the inner peripheral surface of the wall thinning counterbore portion 11b is so shaped as to be delimited by the cylindrical surface region 11ba, the radially lying annular surface region 11bc and the generally arcuate transit surface region 11bb intervening between the cylindrical surface region 11ba and the radially lying annular surface region 11bc and having the radius of curvature R equal to or greater than 1.9 mm, it is possible to reduce the amount of the diameter of a hub pilot area 11d reduced when the tubular crimping wall 9b is radially outwardly crimped. It is to be noted that the hub pilot area 11d referred to above is defined in an inboard end portion of the axial bore 11 of the hub axle 9 and is, in the illustrated embodiment, defined by the intermediate diameter portion 11c. Thanks to the reduction of the amount of the diameter of the hub pilot area 11d reduced during the crimping process, it is possible to accomplish a diameter expansion by crimping to such an extent that insertion of the stem portion 13a of the outer race 13 of the constant velocity joint and engagement, which serves as a counterpart component, with a stem pilot portion 13ab, which is a base end of the stem portion 13a, will not be hampered.

In view of the foregoing, along with securement of the assemblability of the wheel support bearing assembly onto the vehicle body structure, the sufficient proof strength of the inner race segment 10 can advantageously be secured. In order to ascertain this, the inventors of the present invention has conducted another series of experiment to compare the wheel support bearing assembly according to this embodiment with two comparative examples, in which the radius of curvature R of the generally arcuate transit surface region 11bb different from that employed in the wheel support bearing assembly according to this embodiment is employed.

During those experiments, the amount of the inner diameter D2 of the hub pilot area 11d reduced when the tubular crimping wall 9b is radially outwardly crimped was measured using various crimping loads (190 kN, 100 kN and 75 kN). Results of the measurement are tabulated in Table 1. It is to be noted that in all examples tested, the inner diameter D1 of the axial bore 11 of the hub axle 6 was 26.4 mm and the inner diameter D2 of the hub pilot area 11d was 29.5 mm. It is also to be noted that the recess in Comparison (2) is represented by the dimension h over which the generally arcuate transit surface region 11 bb is set back from the radially lying annular surface region 11bc as shown in FIG. 22B.

TABLE 1

Radius of Curvature R and Amount of Hub Inner Diameter Reduced

| Configuration of Hub Axle | | Embodiment | Comp. (1) | Comp. (2) |
|---|---|---|---|---|
| Wall Thickness t of Wall 9b (mm) | | | 1.5 | |
| Set-back D of Wall 9b (mm) | | | 1.0 | |
| Inclination Angle α (°) | | | 45 | |
| Radius of Curvature R | | 2.0 | 1.2 | 1.2 + Recess |
| Amount of Hub Inner Diameter Reduced (μm) | Crimping Load: 190 kN | 16 | 37 | 36 |
| | Crimping Load: 100 kN | 13 | 21 | 28 |
| | Crimping Load: 75 kN | — | 21 | 28 |

From the results of the experiments, it has been ascertained that the amount of the inner diameter D2 of the hub pilot area, which was reduced as a result of the radially outward crimping of the tubular crimping wall 9b in the wheel support bearing assembly according to this embodiment is quite smaller than that in any one of Comparisons (1) and (2) at any one of the crimping loads applied. Specifically, the results of the experiment make it clear that if the radius of curvature R of the generally arcuate transit surface region 11bb is increased, the amount of the inner diameter D2 of the hub pilot area reduced can be minimized. It is also ascertained with the radius of curvature R chosen to be 2.0 mm and with an tolerance of ±0.1 mm taken into consideration, it is possible to achieve the radially outward crimping of the tubular crimping wall 9b, which results in a minimized deformation and which does not hamper the engagement with the counterpart component. Considering the tolerance of ±0.1 mm, the maximum radius of curvature that can be employed in the practice of this embodiment will be 1.9 mm.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing each of the foregoing embodiments of the present invention, the radial height P shown in FIG. 2 has been described as 0.13 mm or more, this radial height W may be not greater than 0.13 mm. In such case, it is possible to increase the ability of engaging in the wall thinning counterbore 16 of the hub axle 9, if the axial length L of the wall thinning counterbore 16 is of a relatively large value and the plastically deformed portion 9b integral with the hub axle 6 is allowed to contact both of the axially inwardly extending peripheral wall 16a and an annular bottom wall or abutment face 16b to allow the plastically deformed portion 9b to substantially completely fill up the wall thinning counterbore 16, i.e., to increase the rate of filled vacancy.

Accordingly, such changes and modifications are, unless they depart from the scope of the present invention as delivered from the claims annexed hereto, to be construed as included therein.

What is claimed is:

1. A wheel support bearing assembly for rotatably supporting a vehicle drive wheel, comprising:
    an outer member having an inner peripheral surface formed with a plurality of raceways;
    an inner member having raceways cooperable with and aligned with the raceways in the outer member and made up of an hub axle and an inner race segment, the hub axle including an inner race mount defined in an inboard end portion thereof with the inner race segment mounted on the inner race mount of the hub axle, and a hub flange formed therein so as to extend radially outwardly therefrom to support the vehicle wheel, and the hub axle being coupled with an outer race of a constant velocity joint, so that an outboard-oriented annular shoulder of the outer race of the constant velocity joint is urged against an annular inboard end face of the inner race segment, the raceways in the inner member being defined in the hub axle and the inner race segment, respectively; and
    a plurality of rows of rolling elements operatively interposed between the raceways in the outer member and the raceways in the inner member, respectively,
    wherein the inner race segment has an inner peripheral surface formed with a counterbore defined at an inboard inner edge portion delimited between an inboard end face of the inner race segment and an inner peripheral surface of the inner race segment, and recessed radially outwardly from the inner peripheral surface of the inner race segment, and the hub axle includes a plastically deformed portion which is, when radially outwardly crimped by means of a crimping technique, brought into engagement with an axially oriented surface area of the counterbore in the inner race segment so that separation of the inner race segment from the hub axle is prevented during mounting of the wheel support bearing assembly on a vehicle body, and
    wherein the plastically deformed portion does not protrude outwardly beyond an inboard end face of the inner race segment and the difference between the inner race mount of the hub axle and an outer peripheral face of the plastically deformed portion is chosen to be 0.13 mm or more.

2. The wheel support bearing assembly as claimed in claim 1, wherein the axially oriented surface area of the counterbore of the inner race segment and the inner peripheral surface of the inner race segment are continued to each other through a transit junction having a curved face.

3. The wheel support bearing assembly as claimed in claim 2, wherein the transit junction, which is the curved face, extends axially within a range off from an imaginary line drawn to define a contact angle of the rolling elements.

4. The wheel support bearing assembly as claimed in claim 1, wherein the raceway in the hub axle is a surface-hardened raceway.

5. The wheel support bearing assembly as claimed in claim 1, wherein the plastically deformed portion is left untreated with heat.

6. The wheel support bearing assembly as claimed in claim 1, wherein the inner race segment is heat treated to harden in its entirety ranging from surface to core thereof.

7. The wheel support bearing assembly as claimed in claim 6, wherein the axially oriented surface area of the counterbore in the inner race segment is turned prior to the heat treatment to form a turned surface.

8. The wheel support bearing assembly as claimed in claim 1, wherein the plastically deformed portion is left untreated with heat and a portion of an outer peripheral surface of the hub axle ranging from the raceway in the hub axle to the inner race mount is hardened to have a hardened surface layer by means of an induction hardening technique and wherein the hardened surface layer has an inboard end set at a point encompassed within a region ranging from a point of intersection between the imaginary line, drawn to define a contact angle and the inner race mount to a point of intersection between the hub axle and the axially oriented face area of the counterbore in the inner race segment.

9. The wheel support bearing assembly as claimed in claim 1, wherein the hub axle has an axial bore defined therein in alignment with a longitudinal axis thereof and an inboard end of the hub axle is formed with a tubular crimping wall having an inner peripheral surface of a diameter greater than the axial bore of the hub axle and wherein the tubular crimping wall extends from a position adjacent an outboard end of the counterbore of the inner race segment to a position adjacent an end face of the inner race segment and has a radial wall thickness within the range of 1.5 to 4 mm, the tubular crimping wall, when plastically deformed by means of a diameter expanding technique, defining the plastically deformed portion.

10. The wheel support bearing assembly as claimed in claim 1, wherein the counterbore is stepped in two stages to define a reduced diameter counterbore portion and a large diameter counterbore portion on an inboard side of the reduced diameter counterbore portion and wherein the inboard end portion of the inner peripheral surface of the inner race mount is provided with a plastically deformed portion which is, when radially outwardly crimped by means of a crimping technique, brought into engagement with the axially oriented surface areas of the reduced diameter counterbore portion and the large diameter counterbore portion in the inner race segment, which plastically deformed portion does not protrude outwardly beyond the inboard end face of the inner race segment.

11. The wheel support bearing assembly as claimed in claim 10, wherein the plastically deformed portion of the hub axle is held in abutment only with the axially oriented surface of the reduced diameter counterbore portion and the axially oriented surface area of the large diameter counterbore portion of the inner race segment and does not contact respective inner peripheral faces of the reduced and large diameter counterbore portions.

12. The wheel support bearing assembly as claimed in claim 11, wherein the hub axle has an axial bore defined therein in alignment with a longitudinal axis thereof and the plastically deformed portion has an inner peripheral surface defining a stepped face portion of a diameter greater than that of the axial bore, and
wherein plastic working of the hub axle is a diametric expansion process to increase a portion of the diameter of the hub axle adjacent the inboard end thereof.

13. The wheel support bearing assembly as claimed in claim 1, wherein the hub axle has an axial bore defined therein in alignment with a longitudinal axis thereof and the counterbore is of a shape including a cylindrical straight surface potion, in the form of a cylindrical surface portion, and an annular end surface portion intervening between the straight surface portion and the inner peripheral surface of the inner race segment.

14. The wheel support bearing assembly as claimed in claim 13, wherein the plastically deformed portion is kept off from the straight surface portion.

15. The wheel support bearing assembly as claimed in claim 14, wherein the annular end surface portion of the counterbore defined in the inner race segment is a tapered face.

16. The wheel support bearing assembly as claimed in claim 15, wherein the tapered face is inclined at an angle of 12° or more relative to the longitudinal axis of the hub axle.

17. The wheel support bearing assembly as claimed in claim 1, wherein the hub axle has an axial bore defined therein in alignment with a longitudinal axis thereof and having an inner peripheral surface formed with a plurality of splined grooves that are engageable with corresponding splined keys defined in an outer periphery of a stem portion of a constant velocity joint and the axial bore includes a general diameter bore portion, where the splined grooves are formed, and wherein the axial bore includes a bore portion located on an inboard side of the general diameter bore portion, which is stepped in two stages to include a large diameter bore portion defining an inner peripheral surface of the plastically deformed portion and an intermediate diameter bore portion of a diameter smaller than that of the large diameter bore portion, but greater than the maximum diameter of the general diameter bore portion as measured in the circle depicted in touch with bottoms of the splined grooves.

18. The wheel support bearing assembly as claimed in claim 17, wherein the intermediate diameter bore portion of the axial bore of the hub axle is positioned at a location axially deep from an axial position of the counterbore of the inner race segment.

19. The wheel support bearing assembly as claimed in claim 18, wherein the large diameter bore portion has an inner peripheral surface of a shape including a crimping jig introducing portion positioned in a deep region of the large diameter bore portion and a tapered portion flaring from the crimping jig introducing portion towards an opening and positioned inside an inner periphery of the plastically deformed portion.

20. The wheel support bearing assembly as claimed in claim 18, wherein the plastically deformed portion of the hub axle has a hardness equal to or lower than HRC 28.

21. A method of crimping a plastically deformed portion in a wheel support bearing assembly as defined in claim 18, wherein the plastically deformed portion in the wheel support bearing assembly has an inner peripheral surface which is a cylindrical portion forming a part of the large diameter bore portion before it is crimped, the method comprising:
urging a crimping die of a structure comprising a free end having an outer peripheral edge tapered to define an annular abutment face, against the cylindrical portion with the annular abutment face held in contact with an open edge of an inner periphery of the cylindrical portion; and
causing the cylindrical portion to radially outwardly expand by crimping to thereby define a plastically deformed portion.

22. The method of crimping the plastically deformed portion in the wheel support bearing assembly as claimed in claim 21, wherein the annular abutment face of the crimping die has a surface roughness equal to or smaller than Ra 1 μm.

23. The method of crimping the plastically deformed portion in the wheel support bearing assembly as claimed in claim 21, wherein the annular abutment face of the crimping die is inclined at an angle within the range of 5° to 60° relative to a longitudinal axis.

24. The method of crimping the plastically deformed portion in the wheel support bearing assembly as claimed in claim 23, wherein the annular abutment face of the crimping die has a hardness equal to or higher than HRC 30.

25. The wheel support bearing assembly as claimed in claim 17, wherein a portion of the large diameter bore portion defining the inner peripheral surface of a plastically deformed portion, which is brought into contact with a crimping die, is rendered to be a tapered portion flaring towards an opening, which is inclined at an angle within the range of 5° to 60° relative to the longitudinal axis of the hub axle.

26. The wheel support bearing assembly as claimed in claim 1, wherein the hub axle has an axial bore defined therein in alignment with a longitudinal axis thereof and an inboard end of the hub axle is formed with a wall thinning counterbore portion of a diameter greater than the axial bore defined in an inner periphery thereof to thereby leave a tubular crimping wall that does not protrude outwardly from an annular end face of the inner race segment, wherein the wall thinning counterbore portion has an inner periphery of a shape delimited by a cylindrical surface region, a radially lying annular surface region and a generally arcuate transit surface region intervening between the cylindrical surface region and the radially lying annular surface region, and wherein the arcuate transit surface region has a radius of curvature equal to or greater than 1.9 mm, the tubular crimping wall being plastically deformed by means of a diameter expanding technique to provide a plastically deformed portion.

27. The wheel support bearing assembly as claimed in claim 1, wherein the counterbore has a radial depth within the range of 0.25 to 2.5 mm.

* * * * *